United States Patent
Suzuki

(10) Patent No.: US 8,045,418 B2
(45) Date of Patent: Oct. 25, 2011

(54) POSITION DETECTING DEVICE, AUTONOMOUS MOBILE DEVICE, METHOD, AND COMPUTER PROGRAM PRODUCT

(75) Inventor: Kaoru Suzuki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1250 days.

(21) Appl. No.: 11/727,138

(22) Filed: Mar. 23, 2007

(65) Prior Publication Data

US 2007/0233321 A1    Oct. 4, 2007

(30) Foreign Application Priority Data

Mar. 29, 2006 (JP) ................ 2006-091993

(51) Int. Cl.
  *G06F 19/00*  (2011.01)
  *G01S 3/808*  (2006.01)
(52) U.S. Cl. ...................... 367/124; 700/245
(58) Field of Classification Search .......... 367/118, 367/120, 124; 382/103; 700/245
  See application file for complete search history.

(56) References Cited

U.S. PATENT DOCUMENTS

| | | | |
|---|---|---|---|
| 5,202,661 A | 4/1993 | Everett et al. | |
| 5,400,244 A | 3/1995 | Watanabe et al. | |
| 5,787,233 A | 7/1998 | Akimoto | |
| 6,182,007 B1 | 1/2001 | Szczerba | |
| 6,907,388 B2 | 6/2005 | Suzuki et al. | |
| 6,967,455 B2 | 11/2005 | Nakadai et al. | |
| 7,289,881 B2 | 10/2007 | Ota et al. | |
| 7,536,029 B2 * | 5/2009 | Choi et al. | 382/103 |
| 2001/0018640 A1 | 8/2001 | Matsunaga | |
| 2003/0229474 A1 | 12/2003 | Suzuki et al. | |
| 2004/0104702 A1 | 6/2004 | Nakadai et al. | |
| 2004/0113777 A1 | 6/2004 | Matsuhira et al. | |
| 2004/0210345 A1 | 10/2004 | Noda et al. | |
| 2004/0254679 A1 | 12/2004 | Nagasaka | |
| 2005/0192778 A1 | 9/2005 | Suzuki et al. | |
| 2005/0216124 A1 | 9/2005 | Suzuki | |
| 2006/0004486 A1 * | 1/2006 | Yoshikawa et al. | 700/245 |
| 2006/0056655 A1 | 3/2006 | Wen et al. | |
| 2006/0058920 A1 | 3/2006 | Matsunaga et al. | |
| 2006/0064202 A1 | 3/2006 | Gutmann et al. | |
| 2007/0027579 A1 | 2/2007 | Suzuki et al. | |
| 2009/0167761 A1 | 7/2009 | Hayashi et al. | |
| 2010/0034422 A1 | 2/2010 | James et al. | |

FOREIGN PATENT DOCUMENTS

JP    63-265312    11/1988

(Continued)

OTHER PUBLICATIONS

Kumeno et al., "Acquisition of Color Pattern for Person Identification by Moving Camera", JSME Conference on Robotics and Mechatronics (2005).

(Continued)

*Primary Examiner* — Ian Lobo
(74) *Attorney, Agent, or Firm* — Nixon & Vanderhye, P.C.

(57) ABSTRACT

A device includes a visual-feature detecting unit that detects a visual feature of a sound source based on an image and visual information thereof and outputs visually localizing information indicative of at least a direction thereof, an auditory-feature detecting unit that detects an auditory feature of the sound source based on a sound and auditory information of the sound source and outputs auditorily localizing information indicative of at least the direction thereof, and a sound-source detecting unit that detects a position of the sound source based on the visually localizing information and the auditorily localizing information.

16 Claims, 14 Drawing Sheets

FOREIGN PATENT DOCUMENTS

| | | |
|---|---|---|
| JP | 4-365104 | 12/1992 |
| JP | 5-101035 | 4/1993 |
| JP | 5-159187 | 6/1993 |
| JP | 8-271274 | 10/1996 |
| JP | 9-120294 | 5/1997 |
| JP | 9-319433 | 12/1997 |
| JP | 10-97274 | 4/1998 |
| JP | 11-257897 | 9/1999 |
| JP | 11-294997 | 10/1999 |
| JP | 2000-30065 | 1/2000 |
| JP | 2000-268265 | 9/2000 |
| JP | 2001-125643 | 5/2001 |
| JP | 2001-154706 | 6/2001 |
| JP | 2002-264051 | 9/2002 |
| JP | 2002-286838 | 10/2002 |
| JP | 2002-307349 | 10/2002 |
| JP | 2003-187399 | 7/2003 |
| JP | 2004-017185 | 1/2004 |
| JP | 2004-185080 | 7/2004 |
| JP | 2004-283959 | 10/2004 |
| JP | 2005-49436 | 2/2005 |
| JP | 2005-134819 | 5/2005 |
| JP | 2005-266014 | 9/2005 |
| JP | 2006-075948 | 3/2006 |

OTHER PUBLICATIONS

Suzuki et al., "Clustering of sound-source signals using Hough transformation, and application to omni-directional acoustic sense for robots", JSAI Technical Report SIG Challenge-0522-9, pp. 53-58 (2005).

Nakatani et al., "Fundamental Frequency Estimation Based on Dominance Spectrum", Technical Report of IEICE, pp. 21-28 (2002).

Japanese Standard Handbook, "3D Vision", Kyoritsu Shuppan Co., Ltd. (1998).

Hirai et al., "Visual Tracking of Human back for Person Following Robot", JSME Conference on Robotics and Mechatronics, 2P1-H-37 (2004).

Nakadai et al., "Real-Time Active Tracking by Hierarchical Integration of Audition and Vision", JSAI Technical Report SIG-Challenge-0113, pp. 35-42 (2001).

Nakadai et al., "Real-Time Active Human Tracking by Hierarchical Integration of Audition and Vision", Proceedings of the 2001 IEEE-RAS Int'l Conference on Humanoid Robots (2001).

Office Action in Japanese Patent Application No. 2006-091993, dated Mar. 30, 2010, and partial English-language translation.

Hiromichi Nakashima et al.; "Construction of the Sound Source Localization Robot by Integration of Motion and Sensing"; Technical Report of IEICE NC, the Institute of Electronics Information and Communication Engineers, Nov. 9, 2001, vol. 101, No. 432, pp. 37-44.

Office Action in Japanese Patent Application No. 2006-091993, dated Jun. 23, 2010, and English-language translation.

Suzuki et al., U.S. Appl. No. 11/064,931, filed Feb. 25, 2005.

Suzuki et al., U.S. Appl. No. 11/396,653, filed Apr. 4, 2006.

* cited by examiner

FIG.3

| TYPE CODE | IMAGE PROCESSING INFORMATION ||||
|---|---|---|---|---|
| 0001 | IMAGE PROCESSING PROCEDURE A | VISUAL FEATURE A | PRIORITY: 2 | SUCCESS PROBABILITY: 60% |
| | IMAGE PROCESSING PROCEDURE B | VISUAL FEATURE B | PRIORITY: 1 | SUCCESS PROBABILITY: 70% |
| | IMAGE PROCESSING PROCEDURE C | VISUAL FEATURE C | PRIORITY: 3 | SUCCESS PROBABILITY: 40% |
| | ... | ... | ... | ... |
| | VISUAL SUCCESS PROBABILITY: 65% | | | |
| | SOUND PROCESSING INFORMATION ||||
| | SOUND PROCESSING PROCEDURE X | AUDITORY FEATURE X | PRIORITY: 3 | SUCCESS PROBABILITY: 30% |
| | SOUND PROCESSING PROCEDURE Y | AUDITORY FEATURE Y | PRIORITY: 2 | SUCCESS PROBABILITY: 50% |
| | SOUND PROCESSING PROCEDURE Z | AUDITORY FEATURE Z | PRIORITY: 1 | SUCCESS PROBABILITY: 55% |
| | ... | ... | ... | ... |
| | VISUAL SUCCESS PROBABILITY: 35% | | | |
| | APPLIED DETECTION-STRATEGY INFORMATION : A, C, B ||||
| TYPE CODE | IMAGE PROCESSING INFORMATION ||||
| 0002 | IMAGE PROCESSING PROCEDURE I | VISUAL FEATURE I | PRIORITY: 3 | SUCCESS PROBABILITY: 30% |
| | IMAGE PROCESSING PROCEDURE J | VISUAL FEATURE J | PRIORITY: 2 | SUCCESS PROBABILITY: 40% |
| | IMAGE PROCESSING PROCEDURE K | VISUAL FEATURE K | PRIORITY: 1 | SUCCESS PROBABILITY: 50% |
| | ... | ... | ... | ... |
| | VISUAL SUCCESS PROBABILITY: 40% | | | |
| | SOUND PROCESSING INFORMATION ||||
| | SOUND PROCESSING PROCEDURE P | AUDITORY FEATURE P | PRIORITY: 1 | SUCCESS PROBABILITY: 80% |
| | SOUND PROCESSING PROCEDURE Q | AUDITORY FEATURE Q | PRIORITY: 2 | SUCCESS PROBABILITY: 70% |
| | SOUND PROCESSING PROCEDURE R | AUDITORY FEATURE R | PRIORITY: 3 | SUCCESS PROBABILITY: 60% |
| | ... | ... | ... | ... |
| | VISUAL SUCCESS PROBABILITY: 70% | | | |
| | APPLIED DETECTION-STRATEGY INFORMATION : B, C, A ||||
| ... | ... | ... | ... | ... |

FIG.11A

| TYPE CODE 0001 | AREA (x1,y1)-(x2,y2) | IMAGE PROCESSING INFORMATION ||||
|---|---|---|---|---|---|
| | | IMAGE PROCESSING PROCEDURE A | VISUAL FEATURE A | PRIORITY: 2 | SUCCESS PROBABILITY: 60% |
| | | IMAGE PROCESSING PROCEDURE B | VISUAL FEATURE B | PRIORITY: 1 | SUCCESS PROBABILITY: 70% |
| | | IMAGE PROCESSING PROCEDURE C | VISUAL FEATURE C | PRIORITY: 3 | SUCCESS PROBABILITY: 40% |
| | | ... | ... | ... | ... |
| | | VISUAL SUCCESS PROBABILITY: 65% | | | |
| | | SOUND PROCESSING INFORMATION ||||
| | | SOUND PROCESSING PROCEDURE X | AUDITORY FEATURE X | PRIORITY: 3 | SUCCESS PROBABILITY: 30% |
| | | SOUND PROCESSING PROCEDURE Y | AUDITORY FEATURE Y | PRIORITY: 2 | SUCCESS PROBABILITY: 50% |
| | | SOUND PROCESSING PROCEDURE Z | AUDITORY FEATURE Z | PRIORITY: 1 | SUCCESS PROBABILITY: 55% |
| | | ... | ... | ... | ... |
| | | VISUAL SUCCESS PROBABILITY: 35% | | | |
| | | APPLIED DETECTION-STRATEGY INFORMATION : A, C, B ||||
| | AREA (x2,y2)-(x3,y3) | IMAGE PROCESSING INFORMATION ||||
| | | IMAGE PROCESSING PROCEDURE A | VISUAL FEATURE A | PRIORITY: 1 | SUCCESS PROBABILITY: 65% |
| | | IMAGE PROCESSING PROCEDURE B | VISUAL FEATURE B | PRIORITY: 2 | SUCCESS PROBABILITY: 60% |
| | | IMAGE PROCESSING PROCEDURE C | VISUAL FEATURE C | PRIORITY: 3 | SUCCESS PROBABILITY: 55% |
| | | ... | ... | ... | ... |
| | | VISUAL SUCCESS PROBABILITY: 60% | | | |
| | | SOUND PROCESSING INFORMATION ||||
| | | SOUND PROCESSING PROCEDURE X | AUDITORY FEATURE X | PRIORITY: 2 | SUCCESS PROBABILITY: 60% |
| | | SOUND PROCESSING PROCEDURE Y | AUDITORY FEATURE Y | PRIORITY: 1 | SUCCESS PROBABILITY: 70% |
| | | SOUND PROCESSING PROCEDURE Z | AUDITORY FEATURE Z | PRIORITY: 3 | SUCCESS PROBABILITY: 50% |
| | | ... | ... | ... | ... |
| | | VISUAL SUCCESS PROBABILITY: 70% | | | |
| | | APPLIED DETECTION-STRATEGY INFORMATION : B, A, C ||||
| | | ... | ... | ... | ... |

FIG.11B

| TYPE CODE 0002 | AREA (x1,y1)-(x2,y2) | IMAGE PROCESSING INFORMATION ||||
|---|---|---|---|---|---|
| | | IMAGE PROCESSING PROCEDURE I | VISUAL FEATURE I | PRIORITY: 3 | SUCCESS PROBABILITY: 30% |
| | | IMAGE PROCESSING PROCEDURE J | VISUAL FEATURE J | PRIORITY: 2 | SUCCESS PROBABILITY: 40% |
| | | IMAGE PROCESSING PROCEDURE K | VISUAL FEATURE K | PRIORITY: 1 | SUCCESS PROBABILITY: 50% |
| | | ... | ... | ... | ... |
| | | VISUAL SUCCESS PROBABILITY: 40% | | | |
| | | SOUND PROCESSING INFORMATION ||||
| | | SOUND PROCESSING PROCEDURE P | AUDITORY FEATURE P | PRIORITY: 1 | SUCCESS PROBABILITY: 80% |
| | | SOUND PROCESSING PROCEDURE Q | AUDITORY FEATURE Q | PRIORITY: 2 | SUCCESS PROBABILITY: 70% |
| | | SOUND PROCESSING PROCEDURE R | AUDITORY FEATURE R | PRIORITY: 3 | SUCCESS PROBABILITY: 60% |
| | | ... | ... | ... | ... |
| | | VISUAL SUCCESS PROBABILITY: 70% | | | |
| | | APPLIED DETECTION-STRATEGY INFORMATION : B, C, A ||||
| | AREA (x2,y2)-(x3,y3) | IMAGE PROCESSING INFORMATION ||||
| | | IMAGE PROCESSING PROCEDURE I | VISUAL FEATURE I | PRIORITY: 1 | SUCCESS PROBABILITY: 60% |
| | | IMAGE PROCESSING PROCEDURE J | VISUAL FEATURE J | PRIORITY: 2 | SUCCESS PROBABILITY: 50% |
| | | IMAGE PROCESSING PROCEDURE K | VISUAL FEATURE K | PRIORITY: 3 | SUCCESS PROBABILITY: 40% |
| | | ... | ... | ... | ... |
| | | VISUAL SUCCESS PROBABILITY: 50% | | | |
| | | SOUND PROCESSING INFORMATION ||||
| | | SOUND PROCESSING PROCEDURE P | AUDITORY FEATURE P | PRIORITY: 1 | SUCCESS PROBABILITY: 80% |
| | | SOUND PROCESSING PROCEDURE Q | AUDITORY FEATURE Q | PRIORITY: 3 | SUCCESS PROBABILITY: 60% |
| | | SOUND PROCESSING PROCEDURE R | AUDITORY FEATURE R | PRIORITY: 2 | SUCCESS PROBABILITY: 70% |
| | | ... | ... | ... | ... |
| | | VISUAL SUCCESS PROBABILITY: 60% | | | |
| | | APPLIED DETECTION-STRATEGY INFORMATION : C, A, B ||||
| ... | ... | ... | ... | ... | ... |

POSITION DETECTING DEVICE, AUTONOMOUS MOBILE DEVICE, METHOD, AND COMPUTER PROGRAM PRODUCT

CROSS-REFERENCE TO RELATED APPLICATIONS

This application is based upon and claims the benefit of priority from the prior Japanese Patent Application No. 2006-91993, filed on Mar. 29, 2006; the entire contents of which are incorporated herein by reference.

BACKGROUND OF THE INVENTION

1. Field of the Invention

The present invention relates to a technology for detecting a sound source and autonomously following the sound source.

2. Description of the Related Art

A robot device has been known in the art that follows a sound source, such as a person, by detecting visual features of the sound source. The visual features are detected from an image of the sound source. The image can be acquired by an image acquiring unit such as a camera. However, there is a limitation on taking images of a person as a sound source. For example, an image of the person cannot be taken when the person steps out of the viewing field of the camera, or when the person walks farther than the visually detectable range, or when the person is hidden behind an obstacle.

If the person is lost from the sight of the camera due to some reason, one approach is to catch sound generated by the person, locate the person from the sound, and turn the camera towards the person, or move towards the person. An example of such a technology is a video conference system that turns a camera in a direction of sound to catch sight of a speaker and frames a face of the speaker.

However, there can be other sound sources around the person. For example, there can be a sound producing door or a television around the target person. In such a case, the sound caught can not necessarily be the voice of the target person, and therefore the robot cannot auditorily locate the person.

There is a demand for a function capable of distinguish a voice of a target person from voices of other persons and other sounds. To realize the technology, the robot device needs to be able to identify auditory features as well as the visual features.

JP-A 2002-307349 (KOKAI) discloses a robot device that detects an object by using visual and audio information of the sound source. A character string acquired by recognizing a word vocalized by a person when a certain object is visible is stored in combination with the image of the object. A user shows the object to the robot device and vocalizes a name of the object, whereby the robot device memorizes the name of the object. When the robot device visually detects the object, the robot device vocalizes the name associated with the image using a synthetic voice.

However, the technology only supplementarily uses the auditory detection for visual detection of the object. Moreover, the sound associated with the image of the object is vocalized by the user that shows the object and not produced from the object. For these reasons, if the robot device loses sight of a certain sound source, there is a risk that the robot device can neither detect nor follow the sound source.

SUMMARY OF THE INVENTION

According to an aspect of the present invention, a position detecting device includes a storage unit that stores therein sound source information including identification information assigned to each sound source that can be visually and auditorily identified, image processing information including an image processing procedure for visually identifying sound sources and visual feature information indicative of visual features of the sound source, sound processing information including a sound processing procedure for auditorily identifying sound sources and auditory feature information indicative of auditory features of the sound source, and a plurality of pieces of detection strategy information indicative of which one or both of the image processing information and the sound processing information is to be used to detect the sound source; an image acquiring unit that acquires an image of the sound sources; a sound collecting unit that collects a sound produced by the sound sources; a visual-feature detecting unit that detects a visual feature of the sound source by performing the image processing procedure based on the image acquired by the image acquiring unit and the image processing information, detects a first position of the sound source from the visual feature, and outputs visually localizing information indicative of the first position of the sound source; an auditory-feature detecting unit that detects an auditory feature of the sound source by performing the sound processing procedure based on the sound collected by the sound collecting unit and the sound processing information, detects a second position of the sound source based on the auditory feature, and outputs auditorily localizing information indicative of the second position of the sound source; and a sound-source detecting unit that controls the visual-feature detecting unit and the auditory-feature detecting unit based on the detection strategy information, and detects a third position of the sound source based on the visually localizing information output from the visual-feature detecting unit and the auditorily localizing information output from the auditory-feature detecting unit.

According to another aspect of the present invention, an autonomous mobile device includes a storage unit that stores therein identification information assigned to each sound source that can be visually and auditorily identified, image processing information including an image processing procedure for visually identifying sound sources and visual feature information indicative of visual features of the sound source, sound processing information including a sound processing procedure for auditorily identifying sound sources and auditory feature information indicative of auditory features of the sound source, and a plurality of pieces of detection strategy information indicative of which one or both of the image processing information and the sound processing information is to be used to detect the sound source; an image acquiring unit that acquires an image of the sound sources; a sound collecting unit that collects a sound produced by the sound sources; a visual-feature detecting unit that detects a visual feature of the sound source by performing the image processing procedure based on the image acquired by the image acquiring unit and the image processing information, detects a first position of the sound source from the visual feature, and outputs visually localizing information indicative of the first position of the sound source; an auditory-feature detecting unit that detects an auditory feature of the sound source by performing the sound processing procedure based on the sound collected by the sound collecting unit and the sound processing information, detects a second position of the sound source based on the auditory feature, and outputs auditorily localizing information indicative of the second position of the sound source; a sound-source detecting unit that controls the visual-feature detecting unit and the auditory-feature detecting unit based on the detection strategy information, and detects a third position of the sound source based on the visually localizing information output from the visual-feature detecting unit and the auditorily localizing information output from the auditory-feature detecting unit; and a positional-relation controlling unit that controls positional relation of the device with the sound source based on the position of the sound source detected by the sound-source detecting unit.

According to still another aspect of the present invention, a method of detecting a position of a sound source that can be visually and auditorily identified, includes acquiring an image of sound sources; collecting a sound produced by the sound sources; first detecting including a visual feature of the sound source based on identification information assigned to each sound source that can be visually and auditorily identified, image processing information including an image processing procedure for visually identifying the sound sources and visual feature information indicative of visual features of the sound source, sound processing information including a sound processing procedure for auditorily identifying the sound sources and auditory feature information indicative of auditory features of the sound source, a plurality of pieces of detection strategy information indicative of which one or both of the image processing information and the sound processing information is to be used to detect the sound source, and the image acquired at the acquiring; second detecting including a first position of the sound source from the visual feature detected at the first detecting; first outputting including outputting visually localizing information indicative of the first position of the sound source detected at the second detecting; third detecting including detecting an auditory feature of the sound source based on the sound processing information and the sound collected at the collecting; fourth detecting including detecting a second position of the sound source based on the auditory feature detected at the third detecting; second outputting including outputting auditorily localizing information indicative of the second position of the sound source detected at the fourth detecting; and fifth detecting including detecting a third position of the sound source based on the visually localizing information output at the first outputting and the auditorily localizing information output at the second outputting.

According to still another aspect of the present invention, a computer program product having a computer readable medium including programmed instructions for detecting a position of a sound source that can be visually and auditorily identified, wherein the instructions, when executed by a computer, cause the computer to perform: acquiring an image of sound sources; collecting a sound produced by the sound sources; first detecting including a visual feature of the sound source based on identification information assigned to each sound source that can be visually and auditorily identified, image processing information including an image processing procedure for visually identifying the sound sources and visual feature information indicative of visual features of the sound source, sound processing information including a sound processing procedure for auditorily identifying the sound sources and auditory feature information indicative of auditory features of the sound source, a plurality of pieces of detection strategy information indicative of which one or both of the image processing information and the sound processing information is to be used to detect the sound source, and the image acquired at the acquiring; second detecting including a first position of the sound source from the visual feature detected at the first detecting; first outputting including outputting visually localizing information indicative of the first position of the sound source detected at the second detecting; third detecting including detecting an auditory feature of the sound source based on the sound processing information and the sound collected at the collecting; fourth detecting including detecting a second position of the sound source based on the auditory feature detected at the third detecting; second outputting including outputting auditorily localizing information indicative of the second position of the sound source detected at the fourth detecting; and fifth detecting including detecting a third position of the sound source based on the visually localizing information output at the first outputting and the auditorily localizing information output at the second outputting.

BRIEF DESCRIPTION OF THE DRAWINGS

FIG. 3 is an example of contents of the sound source information;

FIGS. 11A and 11B are an example of contents of sound source information according to the second embodiment.

DETAILED DESCRIPTION OF THE INVENTION

Exemplary embodiments of the present invention are explained below in detail referring to the accompanying drawings. A position detecting device and an autonomous mobile device according to the present invention are applied to an autonomous mobile robot device (hereinafter, "robot device") in the following embodiments. The present invention is not limited to the embodiments explained below.

Figure 1:
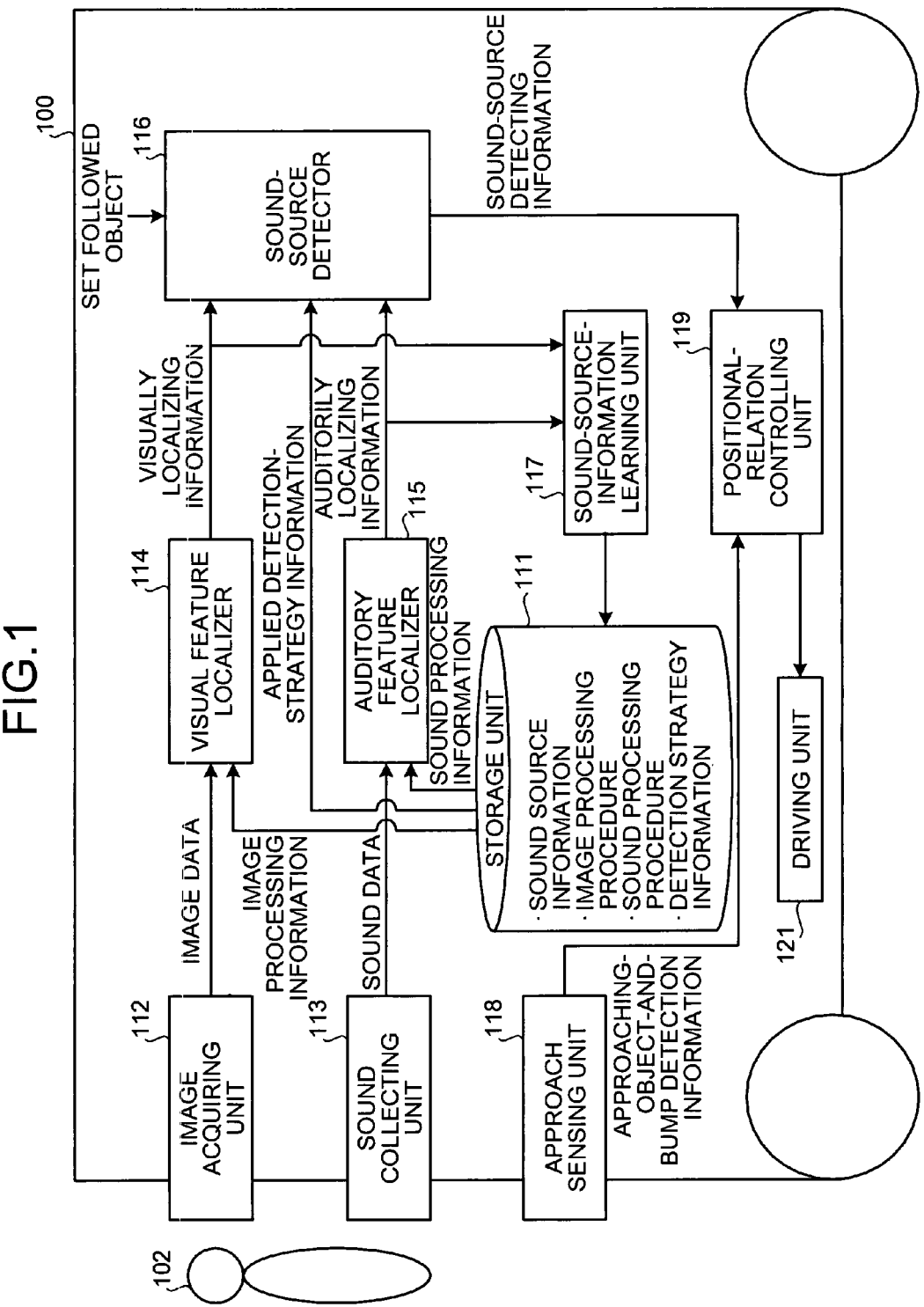
FIG. 1 is a block diagram of a robot device according to a first embodiment of the present invention.

As shown in FIG. 1, a robot device 100 according to a first embodiment includes an image acquiring unit 112, a sound collecting unit 113, an approach sensing unit 118, a visual feature localizer 114, an auditory feature localizer 115, a sound-source detector 116, a sound-source-information learning unit 117, a positional-relation controlling unit 119, a driving unit 121, and a storage unit 111.

A person can be visually distinguished from other persons from his/her face and clothes. Moreover, persons make voice and sound, so that a person can be recognized from his/her voice and sound. Such an object that can be visually and auditorily distinguished will be referred to as a sound source below. Visually detecting the sound source is referred to as visual detection, and auditorily detecting the sound source is referred to as auditory detection below.

The image acquiring unit 112 acquires an image, i.e., image data, of the sound sources. The image acquiring unit 112 can be a stereo camera mounted on an automatic camera platform. The stereo camera acquires an image, i.e., stereo image data, at constant intervals.

The sound collecting unit 113 collects sound produced by the sound sources. The sound collecting unit 113 can be a plurality of microphones. The microphones collect the sound produced by the sound sources and output acoustic signals as multi-channel sound stream data.

The approach sensing unit 118 detects an approaching object or a bump (i.e., step) on a floor. The approach sensing unit 118 can be a combination of a plurality of ultrasonic sensors and a plurality of position sensitive detector (PSD) sensors that detects an object approaching the robot device or a bump on the floor, in any direction, and outputs approaching-object-and-bump detection information indicative of the direction in which the approaching object or the bump is present.

The storage unit 111 can be a hard disk drive (HDD) or a memory device that stores therein sound source information, computer programs that implement image processing and sound processing on a computer, and detection strategy information including three detection strategies.

The sound source information includes knowledge information for detecting sound sources, and it is registered with respect to each sound source.

Figure 2:
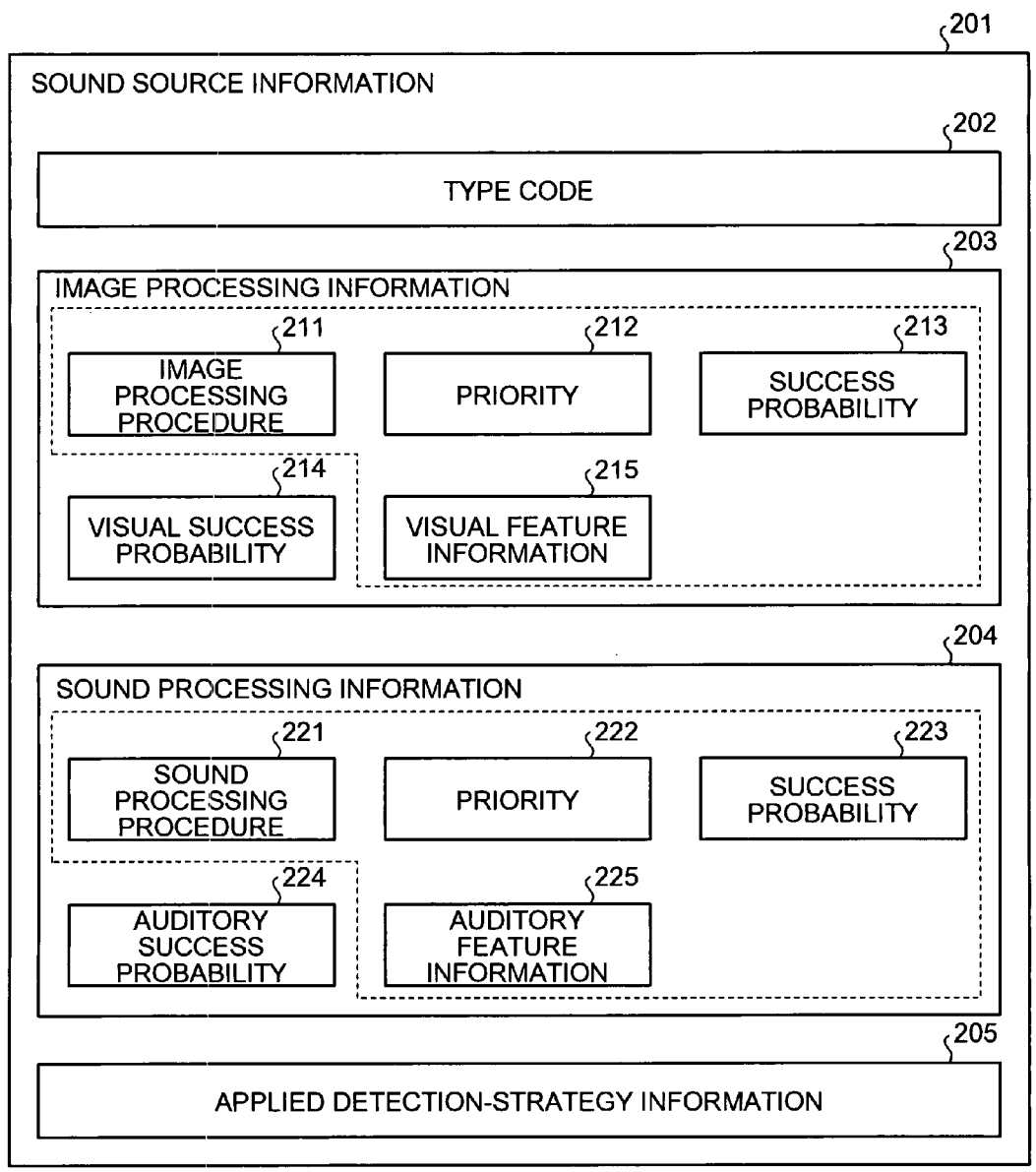
FIG. 2 is an example of contents of sound source information in a storage unit shown in FIG. 1.

As shown in FIGS. 2 and 3, sound source information 201 includes a type code 202, image processing information 203, sound processing information 204, and applied detection-strategy information 205 associated with one another.

The type code 202 includes identifying information such as a character string, a symbol, or a number unique to each sound source. Type codes 0001, 0002, . . . have been used in the example shown in FIG. 3.

The image processing information 203 includes information for detecting the sound source in the image data, which is acquired by the image acquiring unit 112, based on the visual features. The image processing information 203 includes, for example, at least one image processing procedure 211, a plurality of pieces of visual feature information 215, a priority 212, and a success probability 213 associated with each other (enclosed in a dotted line), and a visual success probability 214. The image processing procedure 211 describes an image processing applicable to visual identification of the sound sources. The visual feature information 215 is referenced by the image processing procedure 211 and indicates visual features of the sound source. The priority 212 indicates priority of the image processing procedure 211.

For example, when the sound source is a person, facial features of the person is the visual feature information 215, and an image processing method to detect and identify the visual feature information 215 is the image processing procedure 211. The image processing can be performed, for example, by using the technology disclosed in JP-A 2000-30065 (KOKAI).

When the back of the person is facing the camera, the face of the person cannot be detected. To prepare for such a situation, the image processing procedure 211 and the visual feature information 215 for identifying the same person using a head of the person, color of the clothes, and the like are registered in advance to the image processing information 203. An image processing for detecting a person's head and clothes can be performed, for example, by using the technology disclosed in "Acquisition Of Color Patterns For Person Identification By Mobile Camera" (ROBOMEC 2005, 1P2-NN-046, June 2005).

The success probability 213 is a proportion of a time period during which the sound source was identified (success time period) to the total time period during which the robot device 100 tried to detect the sound source using the corresponding image processing procedure (trial time period). The visual success probability 214 is the maximum value of the success probability 213 of each of the applicable image processing procedures 211.

The priority 212 is the rank order (1, 2, . . . ) when the success probabilities 213 of all the image processing procedures 211 applicable to the sound source are arranged in descending order. The smaller value of the priority 212 indicates the higher priority.

The visual feature information 215 includes visual features of the sound source that need to be referenced to detect the sound source when the image processing procedure is performed. For example, the visual feature information 215 corresponding to the image processing procedure 211 that identifies a specific person by the face is facial image pattern information referenced by the image processing procedure 211.

The sound processing information 204 includes information for detecting the sound source in the sound data, which is acquired by the sound collecting unit 113, based on the auditory features. The sound processing information 204 includes, for example, a plurality of sound processing procedures 221, a plurality of pieces of auditory feature information 225, a priority 222, and a success probability 223 associated with each other (enclosed in a dotted line), and an auditory success probability 224. The sound processing procedure 221 describes a sound processing applicable to auditory identification of the sound sources. The auditory feature information 225 is referenced by the sound processing procedure 221 and indicates auditory features of the sound source. The priority 222 indicates priority of the sound processing procedure 221.

For example, when the sound source is a person, a voice-print of the person is the auditory feature information 225, and a sound processing method to detect and identify the auditory feature information 225 is the sound processing procedure 221. The sound processing can be performed, for example, by using the technology disclosed in JP-A H10-97274 (KOKAI).

When the person is silent, the voice of the person cannot be detected. To prepare for such a situation, the sound processing procedure 221 and the auditory feature information 225 for identifying the same person using footsteps of the person are registered in advance to the sound processing information 204. A sound processing for detecting a person's footsteps can be performed, for example, by using the technology disclosed in JP-A 2000-268265 (KOKAI).

The success probability 223 is a proportion of a time period during which the sound source was identified (success time period) to the total time period during which the robot device 100 tried to detect the sound source using the corresponding sound processing procedure (trial time period). The auditory success probability 224 is the maximum value of the success probability 223 of each of the applicable sound processing procedures 221.

The priority 222 is the rank order (1, 2, . . . ) when the success probabilities 223 of all the sound processing procedures 221 applicable to the sound source are arranged in descending order. The smaller value of the priority 212 indicates the higher priority.

The auditory feature information 225 includes auditory features of the sound source that need to be referenced to detect the sound source when the sound processing procedure is performed. For example, the auditory feature information 225 corresponding to the sound processing procedure 221 that identifies a specific person by the voice is voiceprint pattern information referenced by the sound processing procedure 221.

The applied detection-strategy information 205 describes priority orders of the following three detection strategies that can be used to detect the sound source. The applied detection-strategy information 205 can be described as "A=1, B=2, C=3" or the like. In the example shown in FIG. 3, the detection strategy information is described as "A, B, C" in the order of the application priority. This indicates that the priority descends in the order of a detection strategy A, a detection strategy B, and a detection strategy C.

The detection strategies A, B, and C are stored in the storage unit 111. While the first embodiment includes three pieces of the detection strategy information, the number of the detection strategy information is not limited to three.

The detection strategy A prioritizes detection based on the visual features using the visual feature localizer 114, and performs detection based on the auditory features using the auditory feature localizer 115 only if the visual detection has failed. In other words, if the visual features are detected, the auditory detection is not performed, and thereby computing resources of the robot device 100 can be saved.

The detection strategy B prioritizes detection based on the auditory features using the auditory feature localizer 115, and performs detection based on the visual features using the visual feature localizer 114 only if the auditory detection has failed. In other words, if the auditory features are detected, the visual detection is not performed, and thereby computing resources of the robot device 100 can be saved.

The detection strategy C always performs both of the visual detection using the visual feature localizer 114 and the auditory detection using the auditory feature localizer 115. If the both detections are successful, the detection strategy C adopts the result of the detection that is regarded more reliable in terms of identification accuracy, range assumption accuracy, and direction assumption accuracy. Because the visual detection is generally assumed more accurate than the auditory detection, the visual detection is prioritized in the first embodiment. The correlation among the three detection strategies can change depending on the combinations of the detecting methods to be applied. For example, use of the detection strategy C cannot save the computing resources; however, the probability of failing to detect the sound source is lower than the strategies A and B because both of the visual detection and the auditory detection are performed at a time.

Sound sources can be different by nature in the visual success probability 214 (easiness of visual detection) and the auditory success probability 224 (easiness of auditory detection). For example, an adult has a smaller chance of hiding behind an obstacle and does not produce sound all the time. Therefore, in case of an adult, the visual detection is likely to be more successful as compared to the auditory detection.

On the contrary, a baby has a larger chance of hiding behind the obstacle and produces sound frequently. Therefore, in case of a baby, the auditory detection is likely to be more successful as compared to the visual detection.

As described above, the detection strategy A, which prioritizes the visual detection, is effective for detecting a sound source that can be more easily detected by the visual features than the auditory features, and the detection strategy B, which prioritizes the auditory detection, is effective for detecting a sound source that can be more easily detected by the auditory features than the visual features. For detecting a sound source that can be detected at similar probabilities with the visual detection and the auditory detection, any one of the visual detection and the auditory detection can be used. However, for detecting a sound source that is detected with low probabilities in both of the visual detection and the auditory detection, the detection strategy C is suitable.

The robot device 100 according to the first embodiment selects the detection strategy depending on features of the sound source.

Returning to the explanation of FIG. 1, the visual feature localizer 114 selects the image processing procedure 211 according to the priority 212 defined in the image processing information 203 and the image data acquired by the image acquiring unit 112, performs the selected image processing procedure 211, detects the visual features of the sound source, and determines at least the direction of the sound source.

In other words, the visual feature localizer 114 detects an image area including the visual features from the stereo image data, which is acquired by the image acquiring unit 112, based on at least one image processing procedure 211 suitable for the sound source and the visual feature information 215 referenced by the image processing procedure 211. If the image area is detected it means that the sound source is also visually detected, and the visual feature localizer 114 computes a relative distance between the robot device 100 and the sound source depicted in the image area based on stereo measurement. At the same time, the visual feature localizer 114 computes a relative direction (a pan angle and a tilt angle) of the sound source from the robot device 100 based on the position of the sound source in the image (proportion to horizontal and vertical angles of view) and the orientation of the camera (the pan angle and the tilt angle). Based on the distance and the direction, the visual feature localizer 114 outputs visually localizing information that includes the type code, the relative distance, and the relative direction of the sound source.

The relative distance of each detected area of the face, the head, and the clothes from the robot device 100 can be figured by detecting the area on each of the stereo images and using a triangulation based on a binocular disparity between the centers of the areas. The relative direction of each area from the robot device 100 can be figured based on the center of the area in the corresponding one of the stereo images.

Moreover, at learning by the sound-source-information learning unit 117 to be described later, the visual feature localizer 114 extracts the visual feature information 215 to be used by the current image processing procedure 211 from a specific area in the input image (image area of the substantially same direction as the sound source being identified), and adds the extracted information to the visual feature information 215 of the sound source. If the visual feature information 215 of the sound source is not included, the visual feature localizer 114 generates the visual feature information 215 for the sound source and adds it to the storage unit 111.

The auditory feature localizer 115 selects the sound processing procedure according to the priority 212 included in the sound processing information 204 and the sound data collected by the sound collecting unit 113, performs the selected sound processing procedure 221, detects the auditory features of the sound source, and determines at least the direction of the sound source.

In other words, the auditory feature localizer 115 analyzes multichannel sound stream data collected by the sound collecting unit 113 and extracts directional sound stream data separated with respect to each sound source in different direction. Moreover, the auditory feature localizer 115 detects the directional sound stream data including the auditory features from each of the directional sound stream data based on at least one sound processing procedure 221 suitable for the sound source and the auditory feature information 225 referenced by the sound processing procedure 221. When the directional sound stream data is detected, the sound source is auditorily detected, and the auditory feature localizer 115 defines the position (the distance, the pan angle, and the tilt angle) of the sound source in the directional sound stream data as the relative distance and direction of the sound source from the robot device 100. Based on the distance and the direction, the auditory feature localizer 115 outputs auditorily localizing information that includes the type code, the relative distance, and the relative direction of the sound source.

The technology disclosed in "Clustering Sound From Sound Source By Hough Conversion And Application To Auditory Function Of Robot" ($22^{nd}$ SIG AI Challenge, JSAI, October 2005) can be used to spatially localizing the sound source (computing the distance, the pan angle, and the tilt angle) by analyzing the multichannel sound stream data collected by the sound collecting unit 113 and detecting sound sources in different directions, as well as separating and extracting the sound (the directional sound stream data) from each of the detected and localized sound source.

Moreover, at learning by the sound-source-information learning unit 117 to be described later, the auditory feature localizer 115 extracts the auditory feature information 225 to be used by the current sound processing procedure 221 from a specific directional sound stream data (the directional sound stream data input from the substantially same direction as the sound source being identified), and adds the extracted information to the auditory feature information 225 of the sound source. If the auditory feature information 225 of the sound source is not included, the auditory feature localizer 115 generates the auditory feature information 225 for the sound source and adds it to the storage unit 111.

The sound-source detector 116 controls the visual feature localizer 114 and the auditory feature localizer 115 to perform the visual detection and the auditory detection. Specifically, the sound-source detector 116 selects one of the detection strategies A, B, and C, controls one of the visual feature localizer 114 and the auditory feature localizer 115 based on the selected detection strategy, and generates sound-source detecting information that describes the direction of and the distance from the sound source based on the visually localizing information by the visual feature localizer 114 and the auditorily localizing information by the auditory feature localizer 115.

Moreover, the sound-source detector 116 updates the success probability 213 and the priority 212 according to the results of the visual detection and the auditory detection. The sound-source detector 116 controls operations of the storage unit 111, the image acquiring unit 112, the sound collecting unit 113, the sound-source-information learning unit 117, the visual feature localizer 114, and the auditory feature localizer 115.

The positional-relation controlling unit 119 controls positional relation between the sound source and the robot device 100 based on the sound-source detecting information output from the sound-source detector 116. The positional-relation controlling unit 119 sends an instruction to the driving unit 121 to stop the robot device 100 for safety when the positional-relation controlling unit 119 detects the approaching object or the bump in the traveling direction of the robot device 100 based on the approaching-object-and-bump detection information from the approach sensing unit 118.

The positional-relation controlling unit 119 controls the storage unit 111, the image acquiring unit 112, the sound collecting unit 113, the visual feature localizer 114, the auditory feature localizer 115, the approach sensing unit 118, and the driving unit 121.

The sound-source-information learning unit 117 enhances the visual feature information 215, which is used by the visual feature localizer 114, and the auditory feature information 225, which is used by the auditory feature localizer 115.

The sound-source-information learning unit 117 generates the auditory feature information 225 of the sound source from the selected sound input from the substantially same direction as the sound source being detected by the visual feature localizer 114, and registers the generated auditory feature information 225 to the sound processing information 204 that corresponds to the type code 202 of the sound source. The sound-source-information learning unit 117 generates the visual feature information 215 of the sound source from the selected area of the image taken in the substantially same direction as the sound source being detected by the auditory feature localizer 115, and registers the generated visual feature information 215 to the image processing information 203 that corresponds to the type code 202 of the sound source.

For this purpose, the visual feature localizer 114 extracts the visual feature information 215 to be used by the current image processing procedure 211 from the specific area in the image and adds or generates the visual feature information 215 as described above.

For the same purpose, the visual feature information 215 extracts the auditory feature information 225 to be used by the current sound processing procedure 221 from the specific directional sound stream data and adds or generates the auditory feature information 225 as described above.

The learning function enables the robot device 100 to learn new or additional visual feature information 215 and auditory feature information 225 while detecting the sound source. For example, the robot device 100 can detect the sound source only visually at first because it has the visual feature information 215 alone; however, the robot device 100 becomes capable of auditorily detecting the sound source because of the learning function. If the existing visual feature information 215 is too old for detection of the sound source, the robot device 100 updates the visual feature information 215 while auditorily detecting the sound source.

The image processing procedure 211 and the sound processing procedure 221 are stored in the storage unit 111 as computer program modules that perform the image processing and the sound processing by referring to the predetermined visual feature information 215 and the predetermined auditory feature information 225. The visual feature localizer 114 and the auditory feature localizer 115 load and execute the program modules.

The storage unit 111 also stores therein computer program modules that perform the image processing and the sound processing for the learning function corresponding to the computer program modules. The sound-source-information learning unit 117 causes the visual feature localizer 114 and the auditory feature localizer 115 to execute the learning computer program modules. For this purpose, the sound-source-information learning unit 117 controls operations of the storage unit 111, the image acquiring unit 112, the sound collecting unit 113, the visual feature localizer 114, and the auditory feature localizer 115.

The driving unit 121 moves the robot device 100 based on the control of the positional relation with the sound source by the positional-relation controlling unit 119.

Figure 4A:
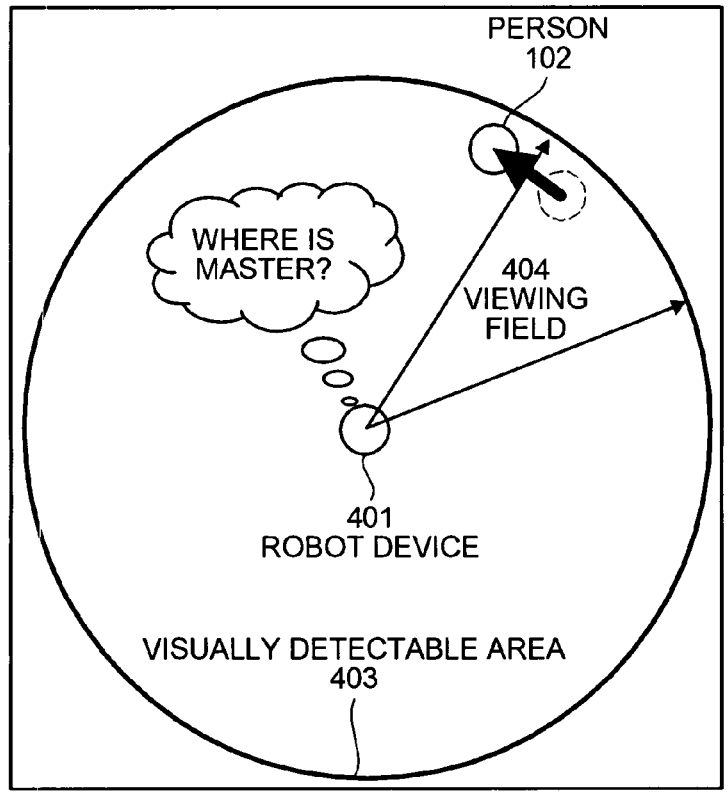
FIG. 4A is a schematic for explaining a first cause of a conventional robot device losing sight of a person to be followed.
Figure 4B:
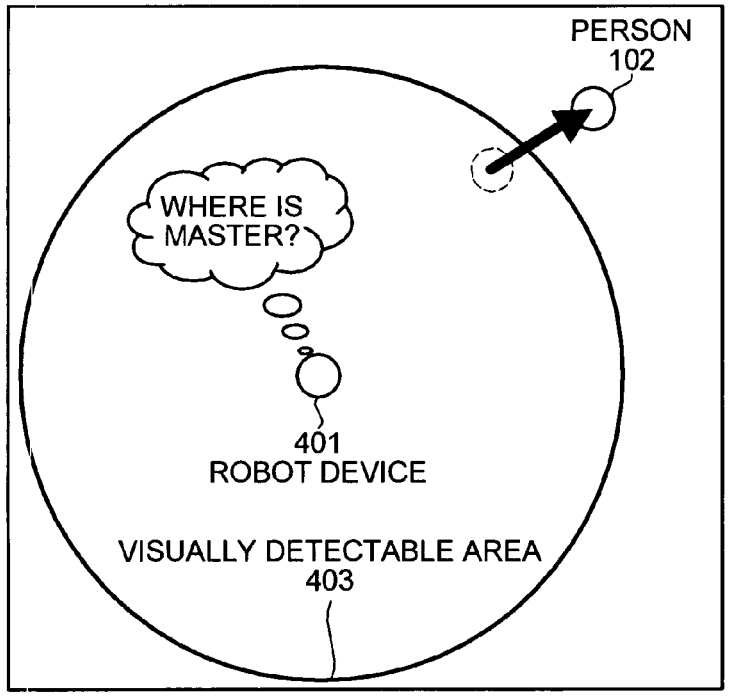
FIG. 4B is a schematic for explaining a second cause of the conventional robot device losing sight of the person.
Figure 4C:
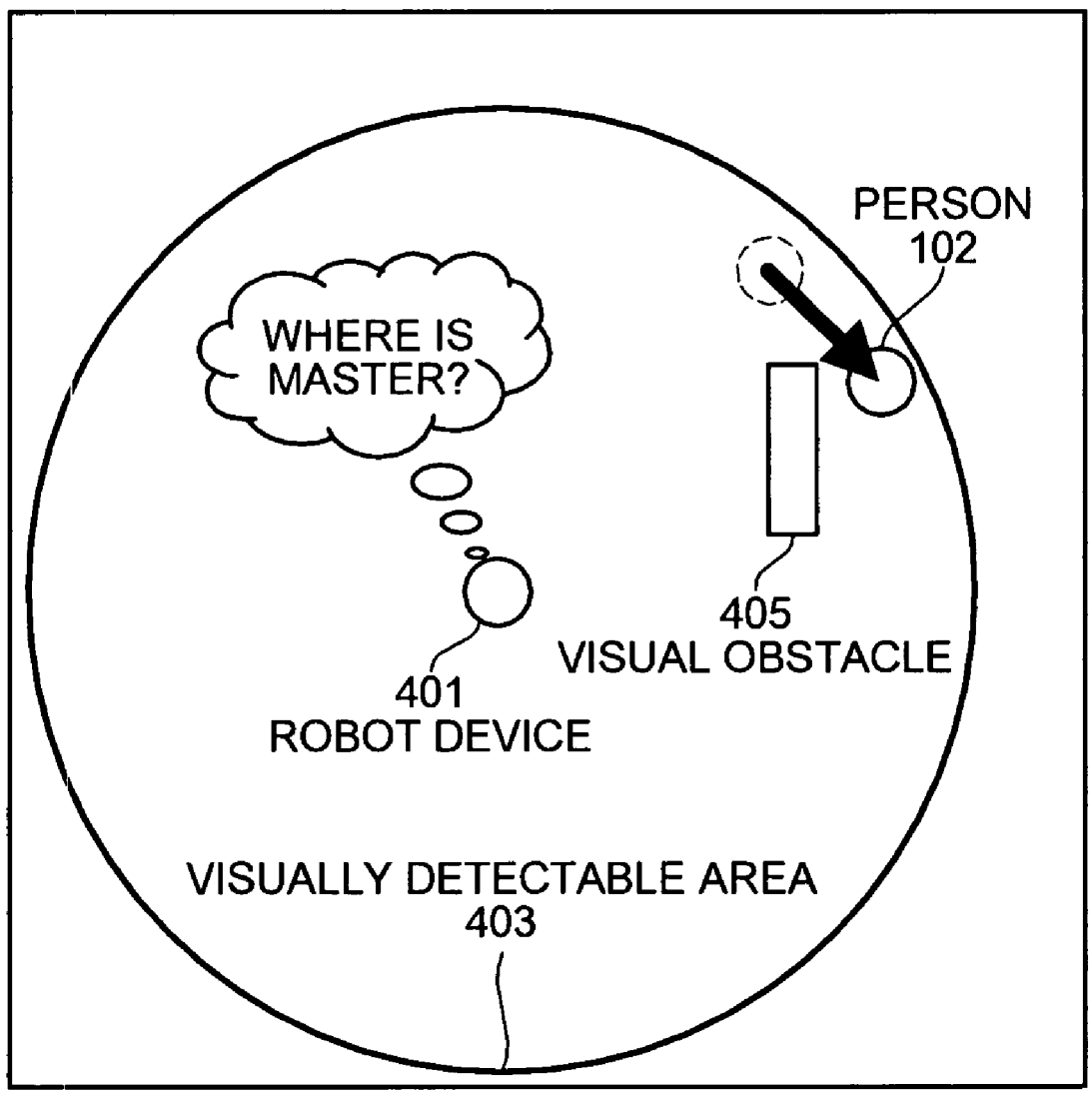
FIG. 4C is a schematic for explaining a third cause of the conventional robot device losing sight of the person.

A conventional robot device follows, as shown in FIG. 4A, to 4C, the sound source by detecting the visual features of the sound source; however, often loses sight of a person 102 that the robot device is trying to follow. There are three major causes of how the conventional robot device loses sight of the person 102. Primarily, the area 403 where a robot device 401 can visually identify the sound source such as the person 102 (hereinafter, "visually detectable area 403") is limited. In the figures, the visually detectable area 403 is simplified as a circle centered at the robot device 401.

A first cause is that, as shown in FIG. 4A, the person 102 is out of a viewing field 404 of the camera. This happens more frequently a narrow-angle camera than with a wide-angle camera.

A second cause is that, as shown in FIG. 4B, the person 102 is out of the visually detectable area 403. With the same pixel count, this happens more frequently with the wide-angle camera than with the narrow-angle camera.

A third cause is that, as shown in FIG. 4C, the person 102 is hidden behind another object 405 (hereinafter, "visual obstacle 405"). This is likely to happen where the camera is at a lower level than the visual obstacles 405.

When the robot device 401 loses sight of the person 102 due to any one of the causes, the robot device 401 catches voice produced by the person 102 and recognizes a direction in which the person 102 is present from the voice. The robot device 401 then turns the camera to the direction of the person or moves in the direction of the person and visually detects the person 102 again to resume following the person 102.

Figure 5:
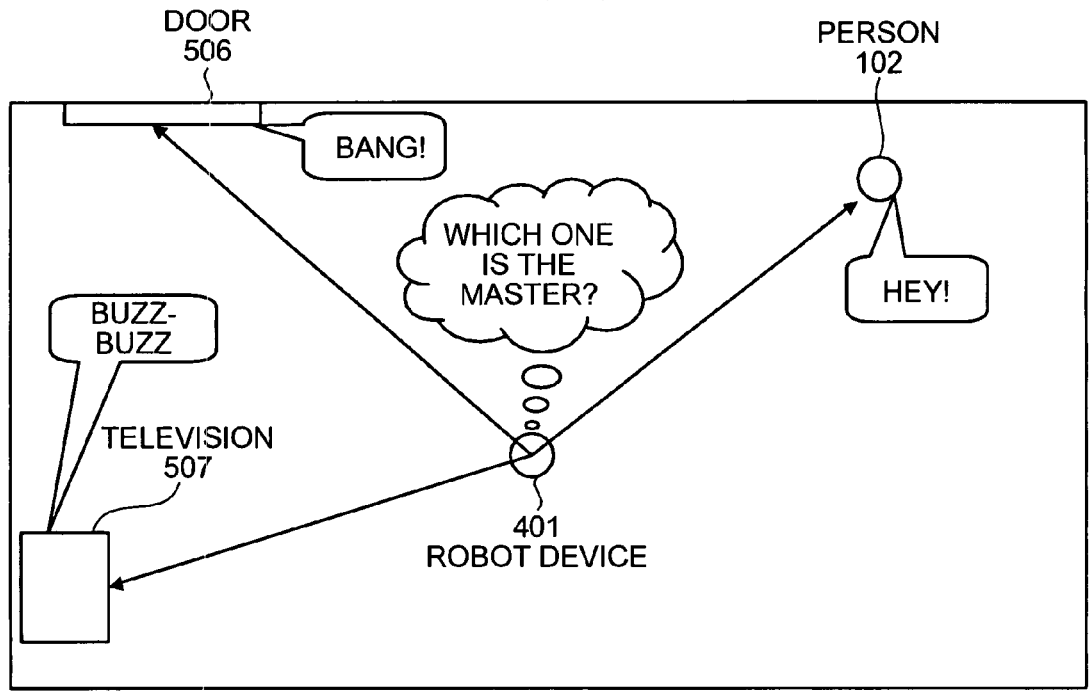
FIG. 5 is a schematic of a status in which the conventional robot device has lost sight of the person when there is a plurality of sound sources.

With the conventional method, the robot device 401 can detect the person 102 again if only the target person 102 produces the voice. However, as shown in FIG. 5, if there is a plurality of sound sources, such as a door 506 and a television 507, in the same room as the person 102, and all of them are producing sound, the sound heard just now is not necessarily produced by the person 102. Thus, the robot device 401 cannot auditorily identify the person 102.

Figure 6:
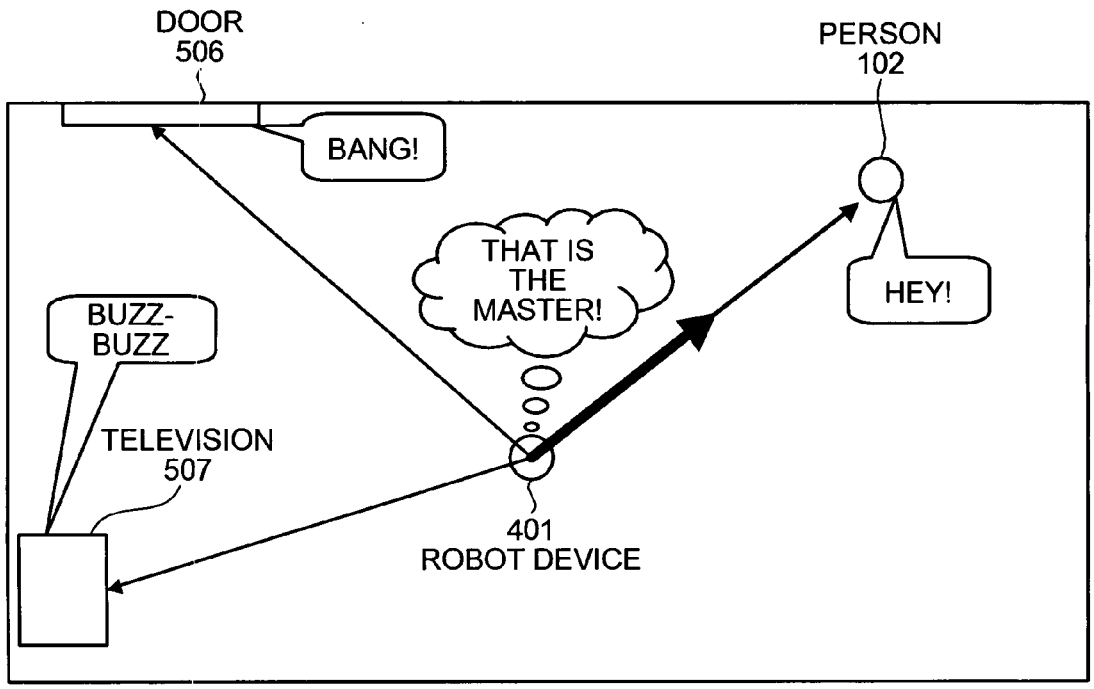
FIG. 6 is a schematic of a status in which a robot device according to the first embodiment has lost sight of the person when there is a plurality of sound sources.

On the contrary, according to the first embodiment, as shown in FIG. 6, when the robot device 100 loses sight of the person 102, who hides behind the visual obstacle 405, the robot device 100 identifies the voice of the person 102 accurately regardless of the door 506, the television 507, or the like that also make sound.

Figure 7:
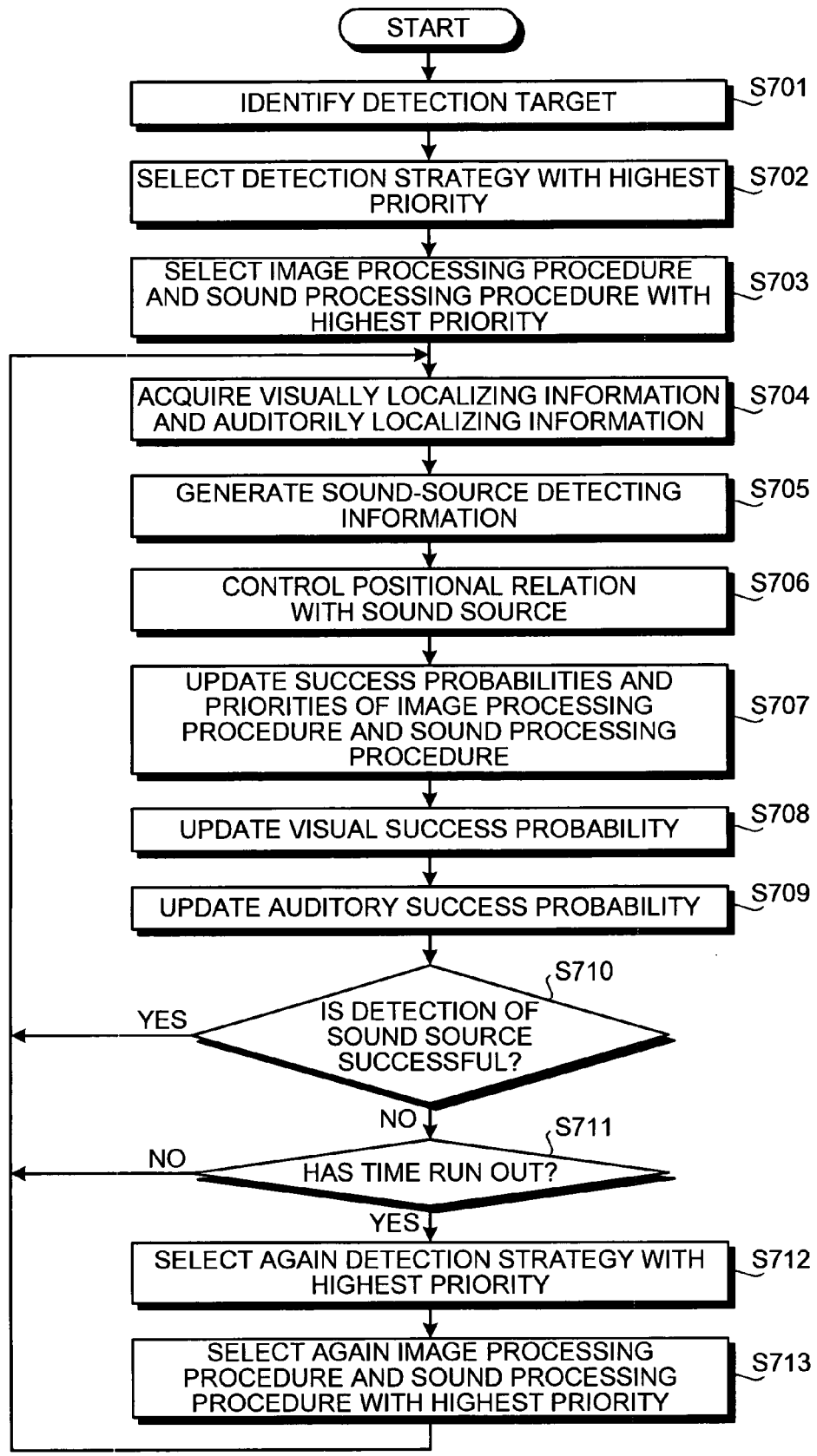
FIG. 7 is a flowchart of a sound source detection process performed by the robot device shown in FIG. 1.

A sound source detection process performed by the robot device 100 is explained referring to FIG. 7.

Before starting the detecting process, the sound-source detector 116 initializes a time-out counter (not shown) to zero. The time-out counter counts the number of continuous failures of the detection. The sound-source detector 116 identifies the detection target, which is also sound source (step S701). The process of identifying a sound source at the step S701 includes recognizing who or what the sound source is and what is the positional relation between the robot device 100 and the sound source.

Assume that the robot device 100 is able to identify a person by his face. In this case, to identify a sound source, the person, who is a detection target, is directed to turn his face toward the camera of the robot device 100 so that the robot device 100 recognizes who the person is, and then directed to presses a start button. The sound-source detector 116 in the robot device 100 accepts the operation of the start button, whereby the robot device 100 is set to identify the detection target. Similarly, if the robot device 100 is capable of identifying a person by his voice, the person is caused to utter words such as "follow me" so that the microphone catches the person's voice, and the sound-source detector 116 accepts the voice input, whereby the robot device 100 is set to identify the detection target. This enables the robot device 100 to understand who the detection target is and the fact that the operation starts. The method of identifying the detection target is not limited to the method mentioned here, i.e., any other method can be used to identify the detection target.

Personal identification by the face and/or the voice can be performed by executing computer program modules that implement the functions of the visual feature localizer 114 and the auditory feature localizer 115. Moreover, interpretation of spoken language is installed as a sub-function of the auditory feature localizer 115. For example, a technology disclosed in JP-A 2005-49436 (KOKAI) can be used for the interpretation of the spoken language.

When the robot device 100 can learn the face of the person, the person 102 that is the detection target shows the face so that the robot device 100 learns the features of the face, and then presses the start button. The sound-source detector 116 in the robot device 100 accepts the operation of the start button, whereby the robot device 100 is set to identify the detection target. When the robot device 100 can learn the voice of the person, the person 102 utters words such as "follow me" to acknowledge the start of the operation to the robot device 100 and the robot device 100 learns the features of the voice, whereby the robot device 100 is set to identify the detection target. The functions of learning the face and the voice are installed in the form of the program modules as the functions of the visual feature localizer 114 and the auditory feature localizer 115.

The sound-source detector 116 selects the detection strategy with the highest priority from among the detection strategies A, B, and C at the moment from the applied detection-strategy information 205 in the sound source information 201 corresponding to the type code of the sound source (step S702).

The sound-source detector 116 sends an instruction to the visual feature localizer 114 to select the image processing procedure 211 and sends an instruction to the auditory feature localizer 115 to control the sound processing procedures 221. Upon receiving the instruction, the visual feature localizer 114 selects, for example, at most two image processing procedures 211 with the highest priority from the image processing information 203 in the sound source information 201 corresponding to the type code of the sound source. The auditory feature localizer 115 selects, for example, at most two sound processing procedures 221 with the highest priority from the sound processing information 204 in the sound source information 201 (step S703). Now the robot device 100 is ready to control the positional relation with the sound source.

At default, both of the success probability 213 of the image processing procedure 211 and the success probability 223 of the sound processing procedure 221 are zero; however, different initial values are set to the priority 212 of the image processing procedure 211, the priority 222 of the sound processing procedure 221, and the priority of the applied detection-strategy information 205.

The sound-source detector 116 operates the visual feature localizer 114 and the auditory feature localizer 115 based on the selected detection strategy, the image processing procedure 211, and the sound processing procedure 221. As a result, the visual feature localizer 114 outputs the visually localizing information and the auditory feature localizer 115 outputs the auditory localizing information, and the sound-source detector 116 acquires the visually localizing information and the auditorily localizing information (step S704).

From the acquired visually localizing information, the sound-source detector 116 generates the sound-source detecting information that describes the direction of and the distance from the sound source and outputs the sound-source detecting information (step S705). The positional-relation controlling unit 119 controls the positional relation between the robot device 100 and the sound source based on the sound-source detecting information (step S706), based on which the driving unit 121 is actuated and the robot device 100 moves.

The sound-source detector 116 updates the success probability 213 and the priority 212 of the image processing procedure 211 based on the result of detection by the visually localizing information, and updates the success probability 223 and the priority 222 of the sound processing procedure 221 based on the result of detection by the auditorily localizing information (step S707). The sound-source detector 116 updates the visual success probability 214 and the auditory success probability 224 based on the updated success probabilities 213 and 223 (steps S708 and S709). The sound-source detector 116 also updates the priority of each detection strategy in the applied detection-strategy information 205 based on the updated visual success probability 214 and the auditory success probability 224.

The sound-source detector 116 determines whether detection of the sound source was successful based on the result of the detection by the visually localizing information and the auditorily localizing information (step S710). If the detection is successful (YES at step S710), the sound-source detector 116 initializes the time-out counter to zero, and repeats the steps S704 to S709.

If the detection fails (NO at step S710), the sound-source detector 116 increments the value of the time-out counter by one. In this manner, the time-out counter counts the number of continuous failures of the detection. The sound-source detector 116 determines whether the time has run out by checking if the value of the time-out counter has reached a time-out threshold (step S711).

When the value of the time-out counter has not reached the time-out threshold, i.e., the time has not run out (NO at step S711), the sound-source detector 116 repeats the steps S704 to S710.

When the value of the time-out counter has reached the time-out threshold, i.e., the time has run out (YES at step S711), the sound-source detector 116 reviews the detection strategy, the image processing procedure 211, and the sound processing procedure 221; because, the detection has failed too many times. Specifically, because the success probability, the visual success probability, and the auditory success probability were updated at the steps S707, S708, and S709, respectively, the sound-source detector 116 again selects the detection strategy with the highest priority in the same manner as in the steps S702 and S703 in principle (step S712).

The visual feature localizer 114 again selects the image processing procedure 211 with the highest priority for the sound source upon receiving the instruction from the sound-source detector 116, and the auditory feature localizer 115 again selects the sound processing procedure 221 upon receiving the instruction from the sound-source detector 116 (step S713).

When the detection strategy, the image processing procedure 211, and the sound processing procedure 221 selected at the steps S712 and S713 are same as those just used, a different combination of the detection strategy, the image processing procedure 211, and the sound processing procedure 221 is randomly selected by using random numbers to perform a trial-and-error process. When the detection strategy, the image processing procedure 211, and the sound processing procedure 221 are newly selected, the sound-source detector 116 repeats the steps S704 to S713.

When the detection strategy A is selected at the step S702, the following operations are performed. When the visually localizing information is constantly output from the visual feature localizer 114 at the step S706, the sound-source detector 116 edits the relative distance and the relative direction in the visually localizing information to form the sound-source detecting information. The positional-relation controlling unit 119 sends an instruction to the driving unit 121 based on the sound-source detecting information so that the distance from the sound source is within a predetermined range, and moves the robot device 100. During this time, the auditory feature localizer 115 is not active.

When visually localizing information is not constantly output from the visual feature localizer 114, the sound-source detector 116 activates the auditory feature localizer 115 and checks whether the auditorily localizing information is output from the auditory feature localizer 115. If the auditorily localizing information is output, the sound-source detector 116 edits the relative distance and the relative direction in the auditorily localizing information to form the sound-source detecting information. The positional-relation controlling unit 119 sends an instruction to the driving unit 121 based on the sound-source detecting information so that the distance from the sound source is within a predetermined range, and moves the robot device 100. At the same time, the sound-source detector 116 turns the stereo camera in the image acquiring unit 112 to the sound source during the travel so that the sound-source detector 116 can visually detect the sound source again.

When the sound-source detector 116 can neither visually nor auditorily detect the sound source, the sound-source detector 116 stops the robot device 100 via the positional-relation controlling unit 119 while incrementing the value of the time-out counter at the steps S712 and S713.

With the detection strategy A, when the sound source is visually detectable, the robot device 100 follows the sound source based on the result of the visual detection. When the sound source is not visually detectable, the robot device 100 visually searches for the sound source while detecting the sound source based on the result of the auditory detection. The detection strategy A is effective for, for example, the robot device 100 following the person 102 based on the visual features that are rather constantly detectable and resuming the following action by making the person 102 produce voice when the robot device loses sight of the person 102.

When the detection strategy B is selected at the step S702, the following operations are performed. When the auditorily localizing information is constantly output from the auditory feature localizer 115 at the step S706, the sound-source detector 116 edits the relative distance and the relative direction in the auditorily localizing information to form the sound-source detecting information. The positional-relation controlling unit 119 sends an instruction to the driving unit 121 based on the sound-source detecting information so that the distance from the sound source is within the predetermined range, and moves the robot device 100. During this time, the visual feature localizer 114 is not active.

When auditorily localizing information is not constantly output from the auditory feature localizer 115, the sound-source detector 116 turns the stereo camera to the direction in which the sound source was last detected so that the sound-source detector 116 can visually detect the sound source again. The sound-source detector 116 then checks whether the visually localizing information is output from the visual feature localizer 114. If the visually localizing information is output, the sound-source detector 116 edits the relative distance and the relative direction in the visually localizing information to form the sound-source detecting information. The positional-relation controlling unit 119 sends an instruction to the driving unit 121 based on the sound-source detecting information so that the distance from the sound source is within the predetermined range, and moves the robot device 100.

When the sound-source detector 116 can neither visually nor auditorily detect the sound source, the sound-source detector 116 stops the robot device 100 via the positional-relation controlling unit 119 while incrementing the value of the time-out counter at the steps S712 and S713.

With the detection strategy B, when the sound source is auditorily detectable, the robot device 100 follows the sound source based on the result of the auditory detection. When the sound source is not auditorily detectable, the robot device 100 auditorily searches for the sound source while detecting the sound source based on the result of the visual detection. The detection strategy B can be used when, for example, the person 102 frequently talks to the robot device 100 for guiding it. The person 102 can guide the robot device 100 with voice when the person 102 is hidden from the robot device 100. When the person 102 appears again, the person 102 can guide the robot device 100 without speaking.

When the detection strategy C is selected at the step S702, the following operations are performed. The sound-source detector 116 checks whether the visually localizing information is output from the visual feature localizer 114 and whether the auditorily localizing information is output from the auditory feature localizer 115. If one of the visually localizing information and the auditorily localizing information is output, the sound-source detector 116 edits the relative distance and the relative direction in the localizing information to form the sound-source detecting information. The positional-relation controlling unit 119 sends an instruction to the driving unit 121 based on the sound-source detecting information so that the distance from the sound source is within a predetermined range, and moves the robot device 100.

When both of the visually localizing information and the auditorily localizing information are constantly output, the sound-source detector 116 according to the first embodiment edits the relative distance and the relative direction in the visually localizing information to form the sound-source detecting information. The positional-relation controlling unit 119 sends an instruction to the driving unit 121 based on the sound-source detecting information so that the distance from the sound source is within a predetermined range, and moves the robot device 100.

When the sound-source detector 116 can neither visually nor auditorily detect the sound source, the sound-source detector 116 stops the robot device 100 via the positional-relation controlling unit 119 while incrementing the value of the time-out counter at the steps S712 and S713.

Figure 8:
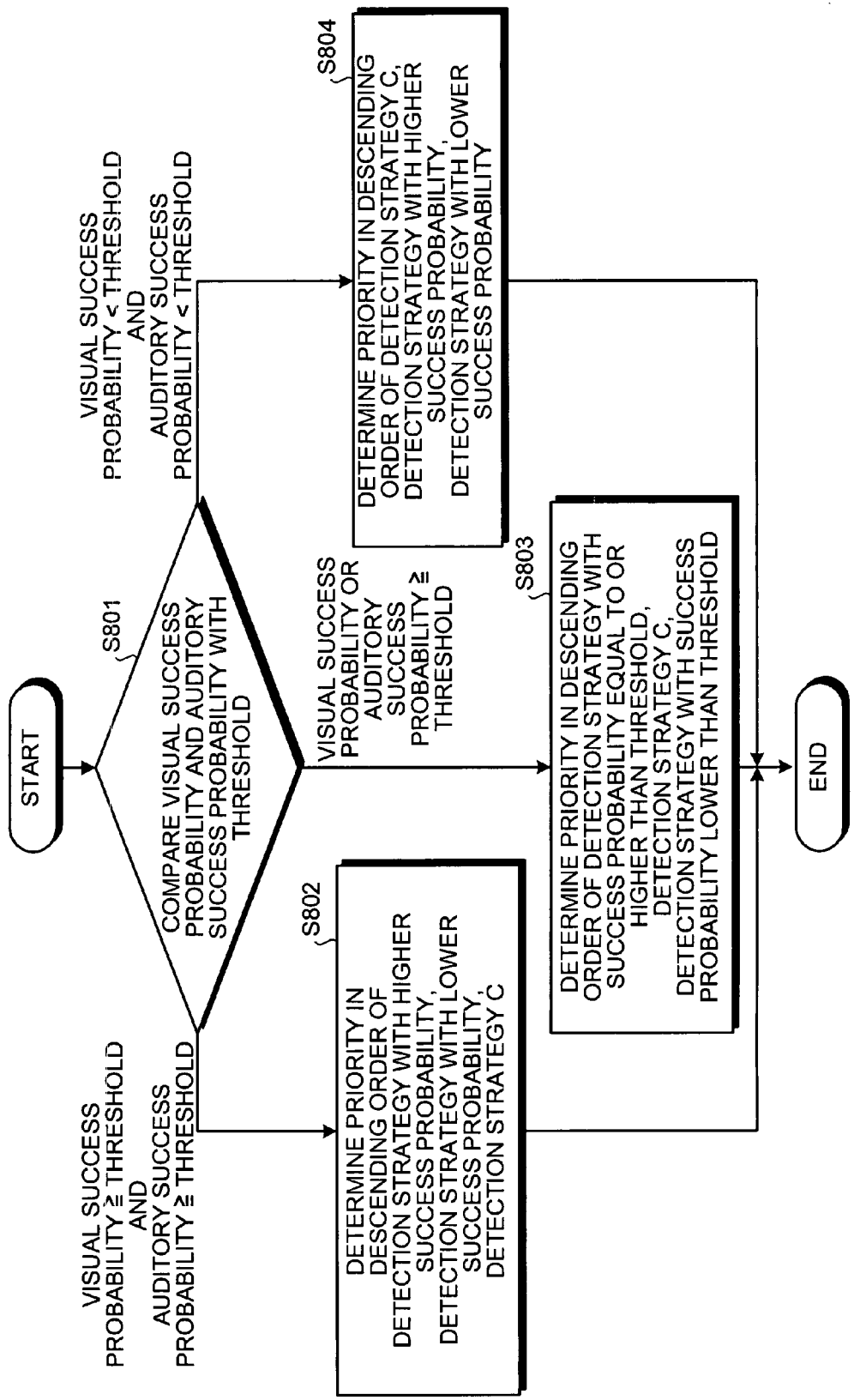
FIG. 8 is a flowchart of a process of determining priority of detection-strategy information set to applied detection-strategy information.

The process of determining priority of detection-strategy information is explained referring to FIG. 8. This process can be performed before detecting the sound source, or performed in combination with updating the image processing procedure 211, the success probabilities 213 and 223 of the sound processing procedure 221, the priorities 212 and 222, the visual success probability 214, and the auditory success probability 224 at the steps S707, S708, and S709.

The sound-source detector 116 compares each of the visual success probability 214 and the auditory success probability 224 with a probability threshold (step S801). When both of the visual success probability 214 and the auditory success probability 224 are equal to or more than the probability threshold, the sound-source detector 116 determines the priority of the detection strategies in descending order from a detection strategy with higher probability, that with lower probability, and the detection strategy C that uses both detection methods (step S802).

When only one of the visual success probability 214 and the auditory success probability 224 is equal to or more than the probability threshold, the sound-source detector 116 determines the priority of the detection strategies in descending order from the detection strategy with higher probability, the detection strategy C, and that with lower probability (step S803).

When both of the visual success probability 214 and the auditory success probability 224 are less than the probability threshold, the sound-source detector 116 determines the priority of the detection strategies in descending order from the detection strategy C, the detection strategy with higher probability, and that with lower probability (step S804).

The sound-source detector 116 describes the priority order of the detection strategies in the determined order, such as "A=1, B=2, C=3", in the applied detection-strategy information 205.

In this manner, the robot device 100 employs both of the detection by the image processing procedure 211 based on the visual feature information 215 of the sound source and the detection by the sound processing procedure 221 based on the auditory feature information 225. As a result, the total success probability of detecting the sound source is higher in the first embodiment than that of the conventional detecting method, which is based on only the visual features.

Moreover, the robot device 100 detects the sound source by combining the image processing procedure 211 and the sound processing procedure 221 optimally adjusted by the detection strategy information suitable for the sound source. As a result, the success probability of detecting the sound source is more stable than that of the conventional detecting method based on the visual features.

Furthermore, when the detection by the optimal combination of the image processing procedure 211 and the sound processing procedure 221 fails, the robot device 100 tries another combination of the image processing procedure 211 and the sound processing procedure 221 to detect the sound source. This increases probability of finding a way out.

Furthermore, because the robot device 100 learns the visual feature information and the auditory feature information required for detection of the sound source while detecting the sound source, the robot device 100 can always keep the detecting ability high.

The robot device 100 combines the detection by the image processing procedure 211 and the detection by the sound processing procedure 221 based on the sound source only. However, relation between the easiness of visual detection by the visual feature information and the easiness of auditory detection by the auditory feature information can vary depending on the environment. For example, in a messy place where obstacles are scattered, it is difficult to visually detect the sound source because the sound source is often hidden behind the obstacles; however, it is less difficult to auditorily detect the sound source because the sound can be heard regardless of the obstacles. On the contrary, in a bare place with few obstacles, it is easy to visually detect the sound source. Furthermore, it is easier to detect footsteps on a hard floor like wood than on a carpet. Taking into account the easiness of the visual detection and the easiness of the auditory detection depending on the environment, a robot device according to a second embodiment of the present invention controls and combines the detection of the sound source based on the image processing procedure 211 and the detection based on the sound processing procedure 221 depending on the area in addition to the sound source.

Figure 9:
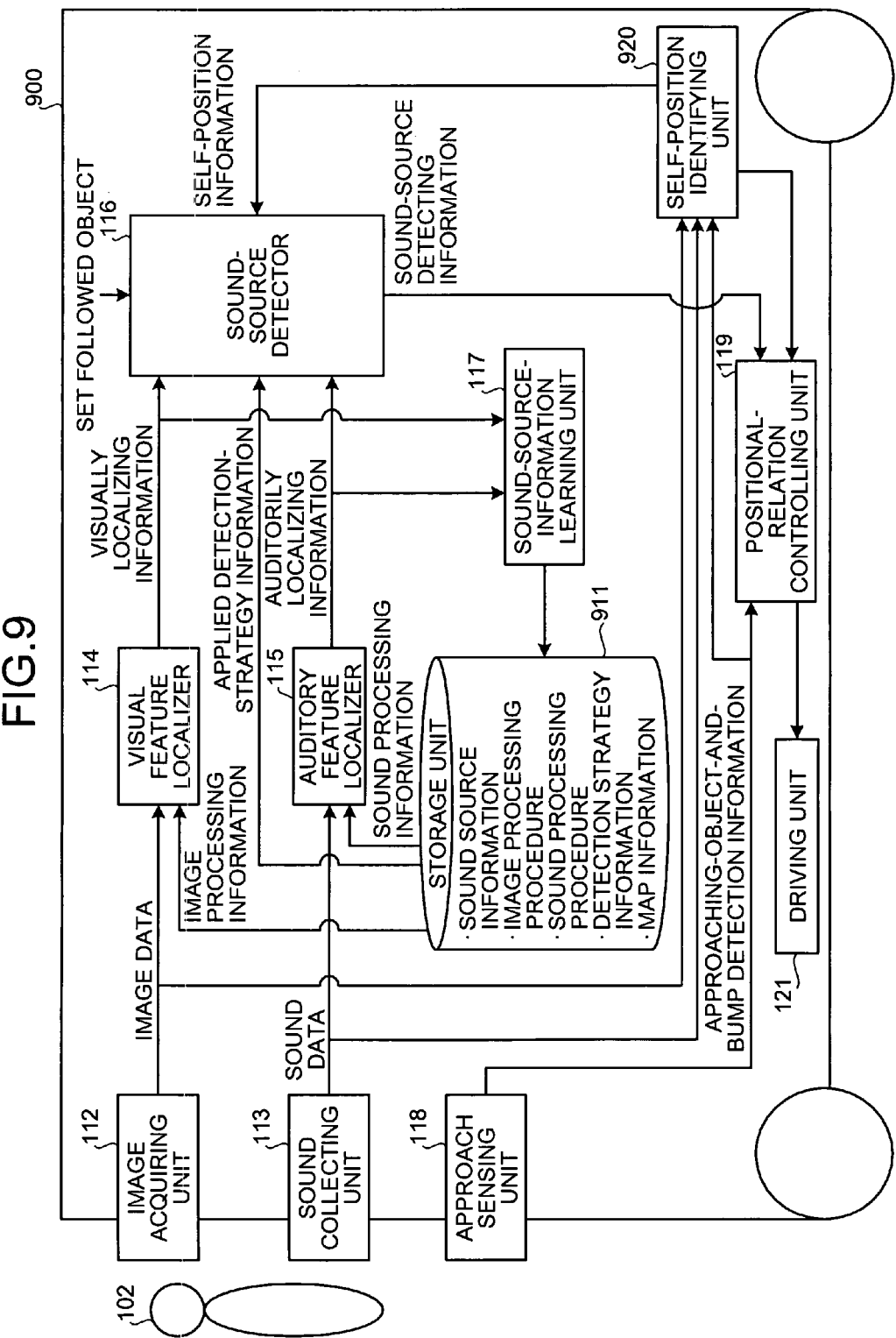
FIG. 9 is a block diagram of a robot device according to a second embodiment of the present invention.

As shown in FIG. 9, a robot device 900 according to the second embodiment includes the image acquiring unit 112, the sound collecting unit 113, the approach sensing unit 118, the visual feature localizer 114, the auditory feature localizer 115, the sound-source detector 116, a self-position identifying unit 920, the sound-source-information learning unit 117, the positional-relation controlling unit 119, the driving unit 121, and a storage unit 911.

The image acquiring unit 112, the sound collecting unit 113, the approach sensing unit 118, the visual feature localizer 114, the auditory feature localizer 115, the sound-source detector 116, the sound-source-information learning unit 117, the positional-relation controlling unit 119, and the driving unit 121 perform the same or similar functions to those in the first embodiment.

The storage unit 911 according to the second embodiment stores therein the sound source information, a plurality of image processing procedures in the form of computer programs, a plurality of sound processing procedures in the form of computer programs, and the detection strategy information including the detection strategies A, B, and C, as in the first embodiment, and additionally stores therein map information. The map information is, for example, a two-dimensional chart, in an x-y coordinate system, indicative of the environment in which the robot device 900 operates.

Figure 10:
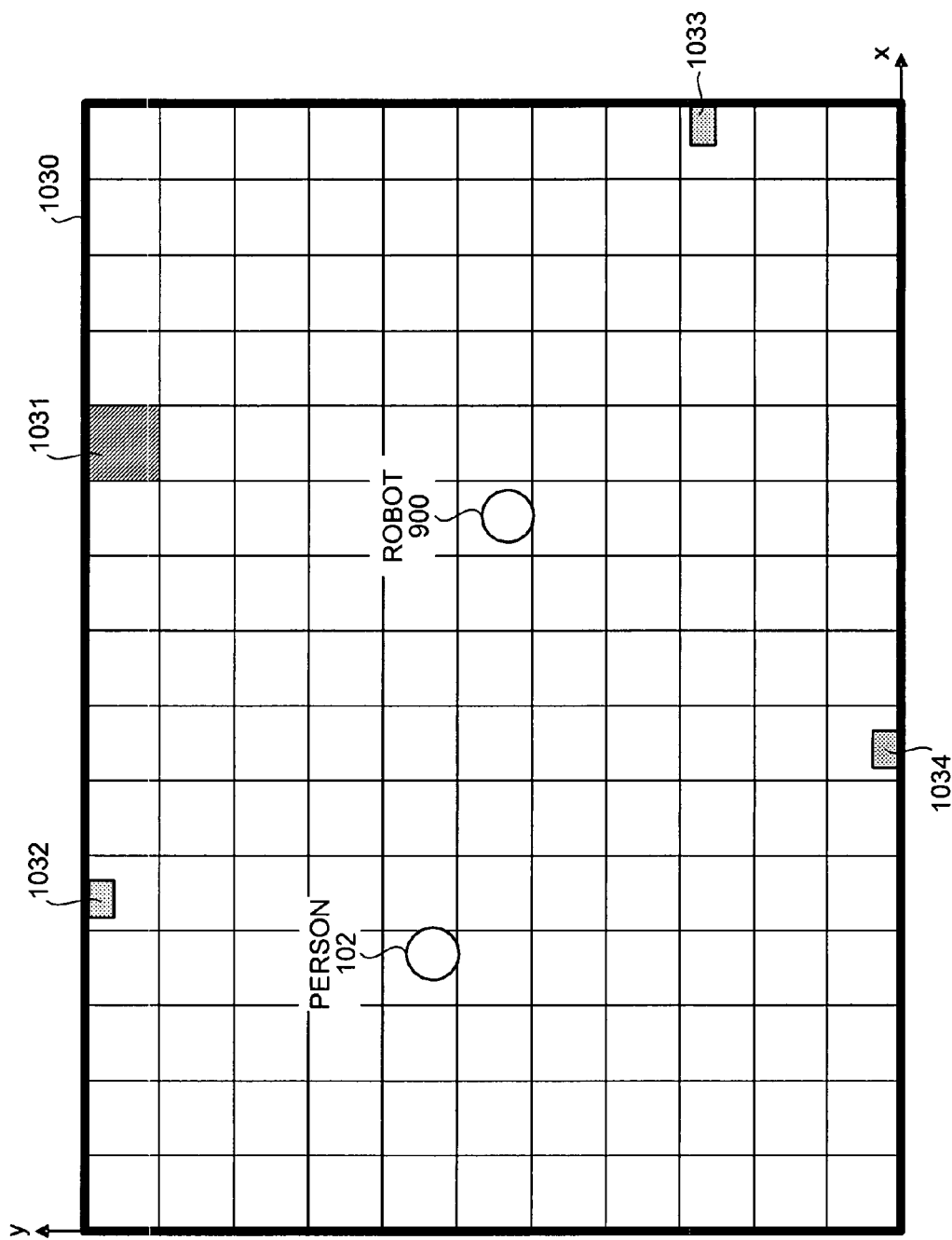
FIG. 10 is an example of map information.

FIG. 10 depicts an example of a map information 1030. The map information 1030 includes a map divided by a predetermined size of a shadowed area 1031 like tiles placed on a floor. A single area 1031 or a plurality of adjacent areas 1031 is referred to as a zone. The map information 1030 includes landmark information indicative of objects 1032, 1033, and 1034 that the robot device 900 uses as landmarks to identify the location of it.

The self-position identifying unit 920 identifies the self-position of the robot device 900 in the map information 1030 using the landmark information. The self-position identifying unit 920 refers to the landmark information in the map information 1030, detects the landmark information in the data input from the image acquiring unit 112, the sound collecting unit 113, and the approach sensing unit 118, assumes the position (an x-y coordinate) and the orientation (the pan angle) of the robot device 900 in the map information 1030 based on the relative distance and the relative direction of the landmark information, and outputs the acquired information as the self-position identifying information.

For the image processing to identify the self-position based on the landmark information, for example, a technology disclosed in JP-A H08-247775 (KOKAI) can be used.

The sound-source detector 116 computes the position of the sound source (the person 102) as the x-y coordinate in the map information 1030 by adding the relative distance and the relative direction of the person 102 from the detected robot device 900 to the position and the direction of the robot device 900 in the self-position identifying information output from the self-position identifying unit 920. The area 1031 that includes the computed x-y coordinate is acquired as the area where the sound source is present.

According to the first embodiment, the image processing procedure 211, the success probability 213 of the image processing procedure 211, and the success probability 223 of the sound processing procedure 221 are determined regardless of the position of the sound source to be detected. However, based on the sound source information according to the second embodiment, the storage unit 911 stores therein, as shown in FIGS. 11A and 11B, the area in which the robot device 900 operates as the map information 1030, and the success probabilities 213 and 223, the priorities 212 and 222, the visual success probability 214, the auditory success probability 224, and the probability of applying each of the detection strategies described in the applied detection-strategy information 205 are set, computed, and stored with respect to each area 1031 in the map information 1030.

When the sound-source detector 116 updates the information, for example, the information is stored separately with respect to the area where the target sound source is present. The sound-source detector 116 selects the detection strategy based on the priority associated with the area of the sound source.

The visual feature localizer 114 selects the image processing procedure 211 associated with the area of the sound source based on the instruction from the sound-source detector 116. The auditory feature localizer 115 selects the sound processing procedures 221 associated with the area of the sound source based on the instruction from the sound-source detector 116.

According to the first embodiment, because the success probability and the priority are not managed in association with the position of the sound source, none of the detection strategy, the image processing procedure, and the sound processing procedure is reviewed unless the failure of the detection continues until the time runs out even when the detection strategy, the image processing procedure, and the sound processing procedure do not work out due to the change of the situation. However, according to the second embodiment, the robot device 900 can be immediately adapted to the changing situations. For example, it is difficult to detect the person 102 in a certain zone because the person 102 is frequently hidden behind obstacles, and it is easy in another zone where the person 102 is hardly hidden behind any obstacle.

Figure 12:
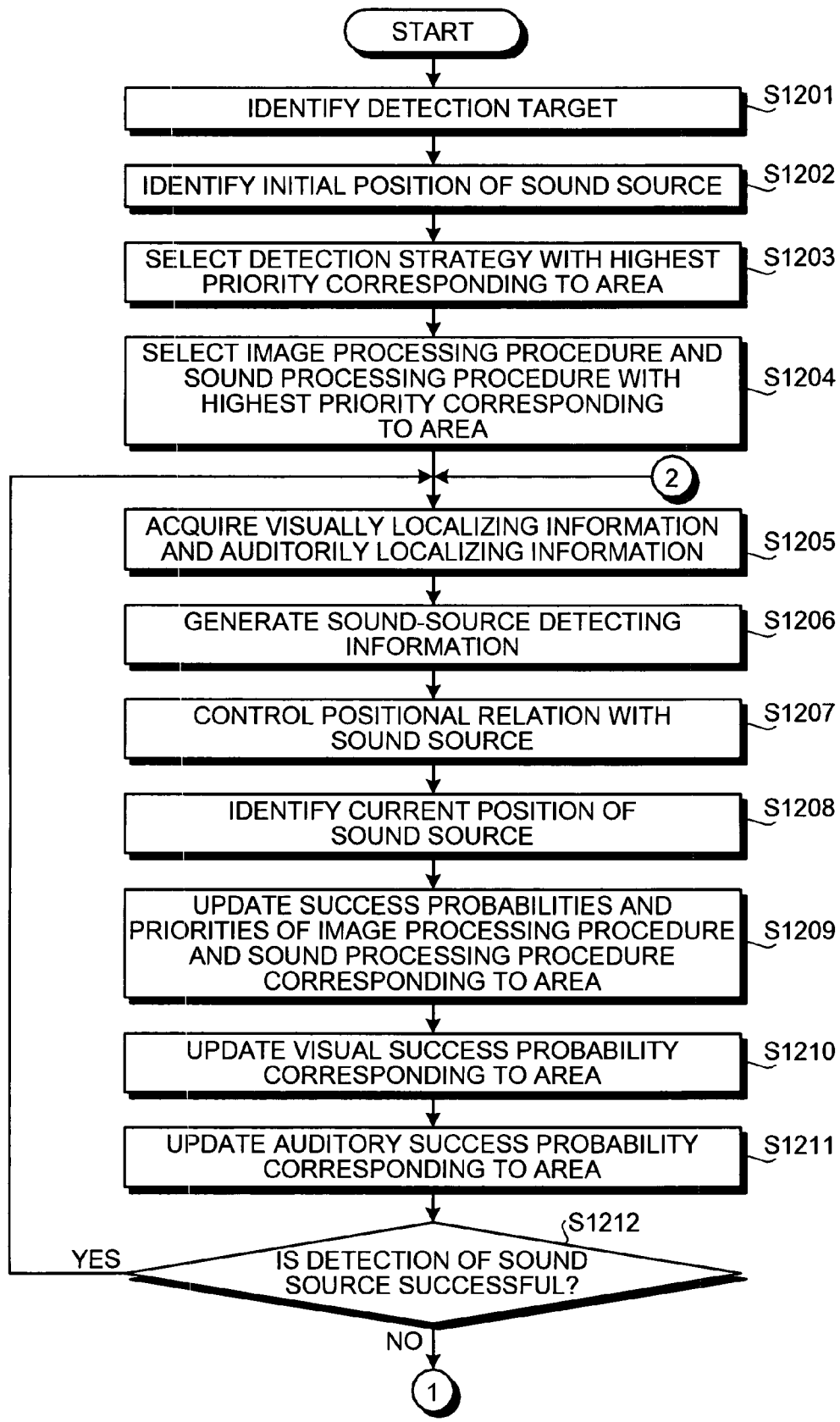
FIGS. 12 and 13 are flowcharts of a sound source detection process performed by the robot device shown in FIG. 9.
Figure 13:
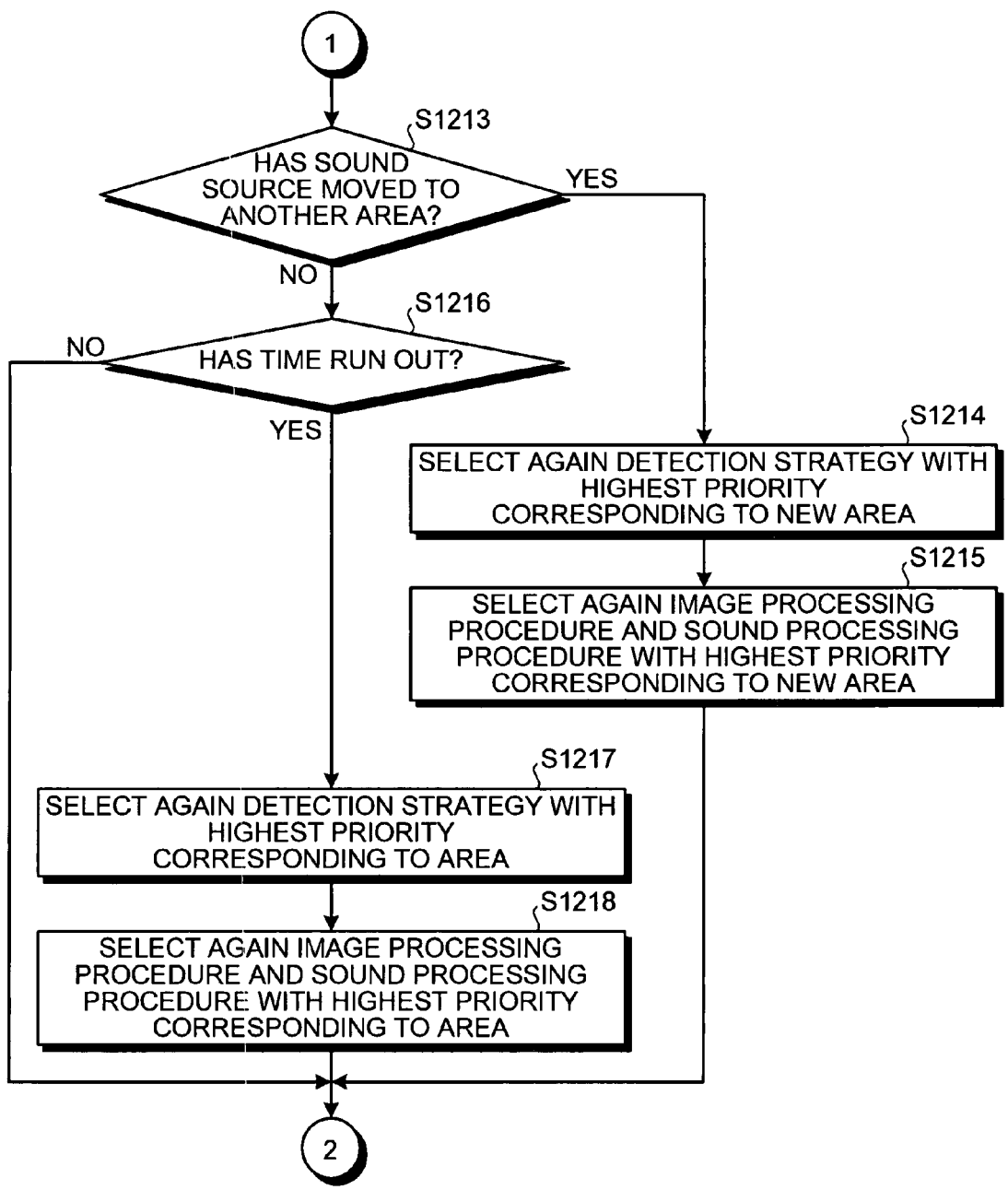

The sound-source detection process according to the second embodiment is explained referring to FIGS. 12 and 13.

Before starting the detecting process, the sound-source detector 116 initializes a time-out counter (not shown) to zero. The time-out counter counts the number of continuous failures of the detection. The sound-source detector 116 identifies the sound source to be detected (step S1201). The sound-source detector 116 computes and identifies the initial position of the sound source in the map information 1030 from the direction of the face or the voice of the sound source and the distance to the face or the voice of the sound source at the time of the setup (step S1202). It is assumed herein that the position and the direction of the robot device 900 in the map information 1030 are known at the start of the detecting process.

The sound-source detector 116 selects the detection strategy with the highest priority among the detection strategies A, B, and C at the moment from the applied detection-strategy information 205 in the sound source information 201 corresponding to the type code and the area of the sound source (step S1203).

The sound-source detector 116 sends an instruction to the visual feature localizer 114 to select the image processing procedure 211 and sends an instruction to the auditory feature localizer 115 to control the sound processing procedures 221. Upon receiving the instruction, the visual feature localizer 114 selects, for example, at most two image processing procedures 211 with the highest priority from the image processing information 203 corresponding to the area of the sound source in the sound source information 201 corresponding to the type code of the sound source. The auditory feature localizer 115 selects, for example, at most two sound processing procedures 221 with the highest priority from the sound processing information 204 corresponding to the area of the sound source (step S1204).

At default, both of the success probability 213 of the image processing procedure 211 and the success probability 223 of the sound processing procedure 221 are zero; however, different initial values are set to the priority 212 of the image processing procedure 211, the priority 222 of the sound processing procedure 221, and the priority of the applied detection-strategy information 205.

The sound-source detector 116 operates the visual feature localizer 114 and the auditory feature localizer 115 based on the selected detection strategy, the image processing procedure 211, and the sound processing procedure 221, and acquires the visually localizing information and the auditorily localizing information (step S1205). Referring to the acquired visually localizing information, the sound-source detector 116 generates and outputs the sound-source detecting information that describes the direction of and the distance from the sound source (step S1206). The positional-relation controlling unit 119 controls the positional relation between the robot device 900 and the sound source based on the sound-source detecting information (step S1207), based on which the driving unit 121 is actuated and the robot device 900 moves.

The self-position identifying unit 920 identifies the current position and the current direction of the robot device 900 in the map information 1030, and the sound-source detector 116 computes coordinate values of the sound source in the map information 1030 so that the area of the sound source is acquired and identified (step S1208).

The sound-source detector 116 updates the success probability 213 and the priority 212 of the image processing procedure 211 corresponding to the area of the sound source based on the result of detection by the visually localizing information, and updates the success probability 223 and the priority 222 of the sound processing procedure 221 corresponding to the area of the sound source based on the result of detection by the auditorily localizing information (step S1209). The sound-source detector 116 updates the visual success probability 214 and the auditory success probability 224 corresponding to the area based on the updated success probabilities 213 and 223 (steps S1210 and S1211). Furthermore, the sound-source detector 116 updates the priority of each detection strategy in the applied detection-strategy information 205 corresponding to the area based on the updated visual success probability 214 and the auditory success probability 224.

The sound-source detector 116 determines whether detection of the sound source was successful based on the result of the detection by the visually localizing information and the auditorily localizing information (step S1212). If the detection was successful (YES at step S1212), the sound-source detector 116 initializes the time-out counter to zero, and repeats the steps S1205 to S1211.

If the detection failed (NO at step S1212), the sound-source detector 116 determines whether the sound source has moved to another area in the map information 1030 (step S1213). If the sound source has moved to another area (YES at step S1213), the sound-source detector 116 again selects the detection strategy with the highest priority based on the applied detection-strategy information associated with the new area (step S1214).

The sound-source detector 116 sends an instruction to the visual feature localizer 114 to select the image processing procedure, and sends an instruction to the auditory feature localizer 115 to select the sound processing procedure. Upon receiving the instruction, the visual feature localizer 114 selects, for example, at most two image processing procedures 211 with the highest priority at this time from the image processing information 203 corresponding to the area of the sound source in the sound source information 201 corresponding to the type code of the sound source. The auditory feature localizer 115 selects, for example, at most two sound processing procedures 221 with the highest priority at this time from the sound processing information 204 corresponding to the area of the sound source (step S1215).

If the sound source has not moved beyond the area (NO at step S1213), the sound-source detector 116 increments the value of the time-out counter by one, whereby counting the number of continuous failures of the detection. The sound-source detector 116 determines whether the time has run out by checking if the value of the time-out counter has reached a time-out threshold (step S1216).

When the value of the time-out counter has not reached the time-out threshold, i.e., the time has not run out (NO at step S1216), the sound-source detector 116 repeats the steps S1205 to S1213.

When the value of the time-out counter has reached the time-out threshold, i.e., the time has run out (YES at step S1216), the sound-source detector 116 reviews the detection strategy, the image processing procedure 211, and the sound processing procedure 221 because the detection failed too many times. Specifically, because the success probability, the visual success probability, and the auditory success probability were updated at the steps S1209, S1210, and S1211, the sound-source detector 116 again selects the detection strategy with the highest priority corresponding to the area in the same manner as the steps S1203 and S1204 in principle (step S1218). When the detection strategy, the image processing procedure 211, and the sound processing procedure 221 selected at the steps S1217 and S1218 are same as those just used, a different combination of the detection strategy, the image processing procedure 211, and the sound processing procedure 221 is selected using random numbers to perform a trial-and-error process. When the detection strategy, the image processing procedure 211, and the sound processing procedure 221 are selected again as described above, the sound-source detector 116 repeats the steps S1205 to S1218.

According to the second embodiment, the process at the steps S1213 to S1218 is repeated only when the detection of the sound source fails at the step S1212. This is because there is no need to change the detection strategy, the image processing procedure 211, and the sound processing procedure 221 when they are valid as a result of the step S1212 no matter the sound source has moved to another area.

In addition to the effects produced by the robot device 100, the robot device 900 controls and combines the detection of the sound source based on the image processing procedure 211 and the detection based on the sound processing procedure 221 depending on the area as well as the sound source. As a result, the robot device 900 can select the detection strategy, the image processing procedure 211, and the sound processing procedure 221 optimal for the environment changing due to the travel of the sound source, resulting in a prompt compliance with the change of the environment.

The robot devices 100 and 900 include a stereo camera and compute the distance to the sound source in an image based on a stereo image taken by the stereo camera. If the size of the sound source is known beforehand, the distance to the sound source can be computed from the size of the sound source in the image taken by a single-lens camera. The distance to the sound source can also be computed from the size of the face in the image assuming that a face of a person is approximately 13 centimeters.

While the auditory feature localizer 115 can spatially localize the sound source according to the first embodiment and the second embodiments, when only the direction can be identified, the robot devices 100 and 900 can approach the sound source by moving in the direction, though they cannot retain an accurate distance from the sound source. As a result, the robot device can visually detect the sound source that was lost with the detection strategy A, or retain the proper distance by the person 102 stopping producing the voice or by the approach sensing unit 118 informing the excessive approach to the person 102 with the strategy B. In other words, while the desirable result of localizing the sound source is both of the distance and the direction, the effect of the present invention can be achieved with the direction alone.

The sound source localizing program executed by the robot devices according to the first embodiment and the second embodiment is preinstalled in a read only memory (ROM) or the like.

Alternatively, the sound source localizing program can be recorded in a computer-readable medium such as a compact disk read only memory (CD-ROM), a flexible disk (FD), a CD recordable (CD-R), and a digital versatile disk (DVD) in an installable or executable format.

As still another alternative, the sound source localizing program can be stored in a computer connected to a network such as the Internet and can be downloaded via the network. The sound source localizing program can be distributed via the network.

The sound source localizing program is configured as a module that includes each of the units (the visual feature localizer 114, the auditory feature localizer 115, the sound-source detector 116, the self-position identifying unit 920, the sound-source-information learning unit 117, and the positional-relation controlling unit 119). A central processing unit (CPU) reads the sound source localizing program from the ROM and executes it, whereby the units are loaded on a main storage unit so that the visual feature localizer 114, the auditory feature localizer 115, the sound-source detector 116, the self-position identifying unit 920, the sound-source-information learning unit 117, and the positional-relation controlling unit 119 are produced in the main storage unit.

The present invention is not limited to the above embodiments. The respective units explained in the embodiments can be modified as desired without much departing from the scope of the present invention. Moreover, some of the units can be combined, other can be divided, and still other can be eliminated. Furthermore, the units in different embodiments can be combined as needed.

An example of the detection of the sound source by the robot device 900 is explained below.

An example of the map information 1030 is explained below. It is assumed that the storage unit 911 in the robot device 900 stores therein the map information 1030 indicative of the environment where the robot device 900 operates. Each of the areas diced in the map information 1030 is assigned with a unique area number. The x-y coordinate system is defined in the map information 1030 as shown in FIG. 10. A format for recording information of each area is defined by an area information structure AREA_INFO described below. The values x0, y0, x1, and y1 in the AREA_INFO are members that store therein the coordinate (x0, y0) at the bottom-left point and the coordinate (x1, y1) at the top-right point of a rectangular zone of the map information. The value of the x-coordinate is smaller toward the left side, and the value of the y-coordinate is smaller toward the bottom, where x0 is smaller than x1 and y0 is smaller than y1.

```
typedef struct [
    int x0; // the x-coordinate at the bottom-left point of the rectangle
    int y0; // the y-coordinate at the bottom-left point of the rectangle
    int x1; // the x-coordinate at the top-right point of the rectangle
    int y1; // the y-coordinate at the top-right point of the rectangle
] AREA_INFO; // definition of the area information structure
```

The map information 1030 is produced as an instance (MapInfo) of the following map information structure (MAP_INFO) that includes the number n1 of the areas included therein and a one-dimensional array of the n1 element of the structure AREA_INFO. The instance herein is a memory area actually allocated in the memory space in the storage unit.

```
typedef struct [
    int n1; // the number of the areas
    AREA_INFO Area[n1]; // the area information
] MAP_INFO; // definition of the map information structure
MAP_INFO MapInfo; // the map information 1030 (instance of the MAP_INFO)
```

Information of a j-th area is stored in MapInfo.Area[j], and the members thereof are indicated as below:
MapInfo.Area[j].x0;
MapInfo.Area[j].y0;
MapInfo.Area[j].x1;
MapInfo.Area[j].y1;

The image processing information 203 is produced as a one-dimensional array IpInfo [n0] of n0 (the number of the sound sources) elements in the following image processing information structure IP_INFO. The n0 is the number of the sound sources registered to the robot device, and the image processing information 203 of a k-th sound source is stored in IpInfo[k,]. The IpInfo[n0] is a member of a sound source information structure OBJ_INFO to be described later.

```
typedef struct [
    int n2; // the number of image processing procedures
    void* pImageProcessing[n2]; // entry address of image processing function (211 and 215)
    float Priority [n2][n1]; // the priority
    PROB_INFO ProbInfo [n2][n1]; // success probability information
    float MaxProbability [n1]; // the visual success probability
] IP_INFO; // Definition of the image processing information structure
IP_INFO IpInfo [n0]; // the image processing information (an instance of the IP_INFO)
```

It is assumed that the image processing information 203 of the k-th sound source includes n2 pieces of the image processing procedures 211. The n2 pieces of the image processing procedures 211 are stored in the pImageProcessing of the IpInfo[k] as the entry address for the program module (the image processing function) that executes the processing, and the i-th image processing function can be referenced in IpInfo [k].pImageProcesing[i]. Each of the image processing functions includes a mating program module for learning (function) and the visual feature information 215 required for the processing. Each of the program modules is provided in the form of a library that can be updated as needed. The image processing function provided as the library is separated into a detection function, a learning function, and an identifying function. An example of the functions is described below.

```
(Subroutine function)
    void IpFaceDetector( ); // a function for detecting a face
area from an image
    void IpColorDetector( ); // a function for dividing the
image into areas of the same color
    void IpTextureDetector( ); // a function for dividing the
image into the areas of the same texture
    void IpDepthDetector( ); // a function for dividing the
image into the areas at the same distance
(Learning function)
    void IpFaceTrainer(k); // a function for learning a face of
the k-th sound source
    void IpColorTrainer(k); // a function for learning colors
of the k-th sound source
    void IpTextureTrainer(k); // a function for learning the
texture of the k-th sound source
(Identifying function)
    void IpFaceIdentifier(k); // a function for identifying a
person by the face area
    void IpColorIdentifier(k); // a function for identifying an
object by the color area
    void IpTextureIdentifier(k); // a function for identifying
the object by the texture area
```

In addition, there is a special code k=WildCardCode for determining which one of all the sound sources is being identified.

The subroutine function provides a predetermined functional capability, and is a utility called in the learning function or the identifying function as needed.

The learning function generates dictionary information that enables the identifying function to identify the area including predetermined features (the face, the color, and the texture) detected and extracted by the subroutine function, and is called by the identifying function as needed.

The identifying function determines whether the extracted area includes the image of the target sound source by comparing the extracted area with the dictionary information generated by the learning function. The visual features (dictionary information) for the detection and the identification are managed and referenced by each function as the visual feature information 215. The IpInfo[k].pImageProcessing[i] includes the entry address of the identifying function, and the type code 202 is assigned to an argument of each function, whereby the identifying function knows which sound source is to be detected and identified. When the argument is the special value WildCardCode, the identifying function determines which one of the n0 pieces of the registered sound sources is to be identified.

The sound processing information 204 is produced as a one-dimensional array SpInfo[n0] of n0 (the number of the sound sources) elements in the following sound processing information structure SP_INFO. The n0 is the number of the sound sources registered to the robot device, and the sound processing information 204 of the k-th sound source is stored in SpInfo[k]. The SpInfo[n0] is a member of the sound source information structure OBJ_INFO to be described later.

```
typedef struct [
    int n3; // the number of sound processing procedures
    void* pSoundProcessing[n3]; // entry address of sound
processing function (221 and 225)
    float Priority [n3][n1]; // the priority (222)
    PROB_INFO ProbInfo [n3][n1]; // success probability
information (including 223)
    float MaxProbability [n1]; // the auditory success
probability (224)
] SP_INFO; // Definition of the sound processing
information structure
    SP_INFO SpInfo[n0]; // the sound processing information 204
(an instance of the SP_INFO)
```

It is assumed that the sound processing information 204 of the k-th sound source includes n3 pieces of the sound processing procedures 221. The n3 pieces of the sound processing procedures 221 are stored in the pSoundProcessing of the SpInfo[k] as the entry address for the program module (the sound processing function) that executes the processing, and the i-th sound processing function can be referenced in SpInfo[k].pSoundProcesing[i]. Each of the sound processing functions includes a mating program module for learning (function) and the auditory feature information 225 required for the processing. Each of the program modules is provided in the form of the library that can be updated as needed. The sound processing function provided as the library is separated into the detection function, the learning function, and the identifying function. An example of the functions is described below.

```
(Subroutine function)
    void SpVoiceDetector( ); // a function for detecting a voice
from a sound
    void SpSoundDetector( ); // a function for detecting a
certain sound from the sound
    void SpSoundLocalizer( ); // a function for calculating the
direction of the sound source
    void SpSoundSeparator( ); // a function for separating and
extracting the sound in a predetermined direction
    void SpSoundRecognizer( ); // a function for interpreting
contents of a speech
(Learning function)
    void SpVoiceTrainer(k); // a function for learning a voice
of the k-th sound source
    void SpSoundTrainer(flg); // a function for learning a
sound specified by the flg
(Identifying function)
    void SpVoiceIdentifier(k); // a function for identifying
the voice of the k-th sound source
    void SpSoundIdentifier(flg); // a function for identifying
the sound specified by the flg
```

In addition, there is a special code k=WildCardCode for determining which one of all the sound sources is being identified. The flg can be, for example, a footstep of a person (HumannWalk), a footstep of a dog (DogWalk), and a bark of the dog (Bowwow).

The subroutine function provides a predetermined functional capability, and is a utility called in the learning function or the identifying function as needed.

The learning function generates dictionary information that enables the identifying function to identify the period including predetermined features detected and extracted by the subroutine function, and is called by the identifying function as needed.

The identifying function determines whether the extracted period is the voice of the target sound source by comparing the extracted period with the dictionary information generated by the learning function. The auditory features (dictionary information) for the detection and the identification are managed and referenced by each function as the auditory feature information 225. The SpInfo[k].pSoundProcessing[i] includes the entry address of the identifying function, and the type code 202 is assigned to an argument of each function, whereby the identifying function knows which sound source is to be detected and identified. When the argument is the WildCardCode, the identifying function determines which one of the n0 pieces of the registered sound sources is to be identified.

The priority of the IP_INFO and the SP_INFO is represented by a two-dimensional array. The first dimension of the array corresponds to the number of the image processing procedure or the sound processing procedure, and the second dimension corresponds to the area number on the map information. In other words, the Priority[i][j] represents the priority of the function referenced by the pImageProcessing[i] or the pSoundProcessing[i] to be executed in the area j.

[Success Probability of the Processing Procedure]

The ProbInfo of the IP_INFO and the SP_INFO is represented by the two-dimensional array. The [n2] and the [n3] in the first dimension correspond to the number of the image processing procedure or the sound processing procedure, and the second dimension [n1] corresponds to the area number on the map information. In other words, the ProbInfo[i][j] represents the detection success probability of the function referenced by the pImageProcessing[i] or the pSoundProcessing [i] to be executed in the area j. The success probability information structure (PROB_INFO) is defined in the following form:

```
typedef struct [
    float TrialTime; // the trial time period
    float SuccessTime; // the success time period
    float Probability; // the success probability (213 or 223)
] PROB_INFO; // definition of the success probability
information structure
```

The success probability is a proportion of the time period during which the sound source was identified (success time period) to the total time period during which the robot device tried to detect the sound source using one of the image processing procedure and the sound processing procedure (trial time period). The PROB_INFO includes the TrialTime and the SuccessTime that base the computation as well as the Probability computed from them. The TrialTime can be difference between the start and the end of the trial (for example, the unit is the second); however, when the detection in the input image or the input sound is performed substantially periodically, the TrialTime can be the number of the times of the detection performed during the trial time (for example, the unit is the time). Similarly, the SuccessTime can be the difference between the start and the end of a continuous success (for example, the unit is the second), or the number of the times of the detection performed during the continuous success (for example, the unit is the time). In any cases, the Probability=SuccessTime/TrialTime can be computed as the proportion of the SuccessTime to the Trial Time, as long as both of the SuccessTime and the TrialTime are described by the same unit.

The visual success probability of the k-th sound source in the area j is described in the IpInfo[k].MaxProbability[j], and the auditory success probability of the k-th sound source in the area j is described in the SpInfo[k].MaxProbability[j]. The success probabilities are computed using the following equations. An operator MAX in each formula represents the maximum value in the parentheses as the number i of the visual success probability and the auditory success probability is changed.

IpInfo[$k$].MaxProbability[$j$]=MAX(IpInfo[$k$].ProbInfo[$i$][$j$].Prob ability);

SpInfo[$k$].MaxProbability[$j$]=MAX(SpInfo[$k$].ProbInfo[$i$][$j$].Prob ability);

The applied detection-strategy information 205 is produced as a one-dimensional array StInfo[n0] of n0 elements in the following applied detection-strategy information structure ST_INFO. The n0 is the number of the sound sources registered to the robot device, and the applied detection-strategy information 205 of the k-th sound source is stored in StInfo[k]. The StInfo[n0] is a member of the sound source information structure OBJ_INFO to be described later.

```
typedef struct [
    float PriorityA[n1]; // the priority of the detection
strategy A
    float PriorityB[n1]; // the priority of the detection
strategy B
    float PriorityC[n1]; // the priority of the detection
strategy C
] ST_INFO; // definition of the applied detection-strategy
information structure
    ST_INFO StInfo[n0]; // the applied detection-strategy
information 205 (an instance of the ST_INFO)
```

The priority of each of the detection strategies A, B, and C is represented by a one-dimensional array including n1 elements, and the priority of the k-th sound source in the area j is stored at each of the following addresses:

StInfo[k].PriorityA[j];
StInfo[k].PriorityB[j];
StInfo[k].PriorityC[j];

The sound source information 201 including the elements is produced as an instance Obj_Info of a sound source information structure OBJ_INFO. The OBJ_INFO includes each of the instances IpInfo[n0], the SpInfo[n0], and the StInfo [n0]. The number n0 of the sound sources registered to the robot device and the number k (the type code 202) of the sound source being detected are also stored in the OBJ_INFO.

```
typedef struct [
    int n0; // the number of the registered sound sources
    int k; // the type code 202
    IP_INFO IpInfo[n0]; // the image processing information 203
(the instance of the IP_INFO)
    SP_INFO SpInfo[n0]; // the sound processing information 204
(the instance of the SP_INFO)
    ST_INFO StInfo[n0]; // the applied detection-strategy
information 205 (the instance of the ST_INFO)
] OBJ_INFO; // definition of the applied detection-strategy
information structure
    OBJ_INFO ObjInfo; // the sound source information 201 (the
instance of the OBJ_INFO)
```

Thus, the storage unit 911 stores therein at least the Map-Info (the map information 1030) and the Obj_Info (the sound source information 201). The storage unit 911 suggestively stores therein the program modules. The program modules can be called from the Obj_Info in the form of the functions. The storage unit 911 further suggestively stores therein the visual feature information 215 and the auditory feature information 225 that are referenced or learned by each of the program modules under the administration of the program module in the form that can be referenced by the module. The storage unit 911 can further store therein various types of information generated during the operation of the robot device.

AN EXAMPLE OF THE FIRST EMBODIMENT

While the example of the robot device 900 according to the second embodiment is explained above, each value is provided to the robot device 100 according to the first embodiment in the form that does not include the array [n1] corresponding to the area number j. Specifically, the IP_INFO, the SP_INFO, and the ST_INFO are defined as below:

```
typedef struct [
    int n2; // the number of the image processing procedures
    void* pImageProcessing[n2]; // the entry address of the
image processing function (211 and 215)
    float Priority[n2]; // the priority (212)
    PROB_INFO ProbInfo[n2]; // success probability information
(including 213)
    float MaxProbability; // the visual success probability
(214)
] IP_INFO; // Definition of the image processing
information structure
typedef struct [
    int n3; // the number of the sound processing procedures
    void* pImageProcessing[n3]; // the entry address of the
image processing function (221 and 225)
    float Priority[n3]; // the priority (222)
    PROB_INFO ProbInfo[n3]; // success probability information
(including 223)
    float MaxProbability; // the auditory success probability
(224)
] SP_INFO; // Definition of the sound processing
information structure
typedef struct [
    float PriorityA; // the priority of the detection strategy
A
    float PriorityB; // the priority of the detection strategy
B
    float PriorityC; // the priority of the detection strategy
C
] ST_INFO; // definition of the applied detection-strategy
information structure
```

In the initial state where the robot device 900 has never been operated, the success probability 213 of the image processing information 203, the success probability 223 of the sound processing information 204, the trial time period, and the success time period in all of the areas (j=1 to n1) by all of the processing procedures (i=1 to n2 or i=1 to n3) of all the sound sources (k=1 to n0) are set to zero. The visual success probability 214 and the auditory success probability 224 determined as the maximum values of the success probability in each area are also zero. Specifically, all of the following values are zero in the initial state.
(The Image Processing Information 203)

```
ObjInfo.IpInfo[k].ProbInfo[i][j].probability=0; // the
success probability (213)
ObjInfo.IpInfo[k].ProbInfo[i][j].TrialTime=0; // the trial
time period
ObjInfo.IpInfo[k].ProbInfo[i][j].SuccessTime=0; // the
success time period
ObjInfo.IpInfo[k].MaxProbability[j]=0; // the visual
success probability (214)
```

(The Sound Processing Information 204)

```
ObjInfo.SpInfo[k].ProbInfo[i][j].probability=0; // the
success probability (223)
ObjInfo.SpInfo[k].ProbInfo[i][j].TrialTime=0; // the trial
time period
ObjInfo.SpInfo[k].ProbInfo[i][j].SuccessTime=0; // the
success time period
ObjInfo.SpInfo[k].MaxProbability[j]=0; // the auditory
success probability (224)
```

On the other hand, different initial values are set to the priority 212 of the image processing information 203, the priority 222 of the sound processing information 204, and the priorities of the detection strategies A, B, and C in the applied detection-strategy information 205, depending on the sound source. A specific example is described below. It is assumed herein that there are roughly distinguished cases depending whether the sound source is a person, and that the priorities can vary depending on the case.
(The Image Processing Information 203)
In the case of n2=3:

```
ObjInfo.IpInfo[k].Priority[1][j]=1; // the priority of the
image processing procedure 1 (212)
ObjInfo.IpInfo[k].Priority[2][j]=2; // the priority of the
image processing procedure 2 (212)
ObjInfo.IpInfo[k].Priority[3][j]=3; // the priority of the
image processing procedure 3 (212)
```

The priority order is set herein as "image processing procedures 1, 2, 3".
(The Sound Processing Information 204)
In the case of n3=3:

```
ObjInfo.SpInfo[k].Priority[1][j]=2; // the priority of the
sound processing procedure 1 (222)
ObjInfo.SpInfo[k].Priority[2][j]=3; // the priority of the
sound processing procedure 2 (222)
ObjInfo.SpInfo[k].Priority[3][j]=1; // the priority of the
sound processing procedure 3 (222)
```

The priority order is set herein as "sound processing procedures 3, 1, 2".
(The Applied Detection-Strategy Information 205)
The priority is represented in descending order.

```
ObjInfo.StInfo[k].PriorityA=1; // the priority of the
detection strategy A
ObjInfo.StInfo[k].PriorityB=3; // the priority of the
detection strategy B
ObjInfo.StInfo[k].PriorityC=2; // the priority of the
detection strategy C
```

The priority is set herein as "detection strategies A, C, B".
An example of the step S1201 in FIG. 12 is given assuming that the target sound source is a person. The process at the step S701 according to the first embodiment is performed in the same manner.

For example, a person A (a commander) says "follow me" from the right rear of the robot device 900. The sound collecting unit 113 in the robot device 900 receives the sound. The library function called in the auditory feature localizer 115 recognizes the direction of the sound source, the distance from the sound source, the fact that the sound is voice of a person, whose voice it is, and the fact that the spoken words are "follow me". The robot device 900 then turns around. Specifically, the process is performed in the following manner:

(1) The SpSoundLocalizer( ) computes the direction and the distance of the position in which the person A spoke, (2) The SpSoundSeparator( ) separates and extracts the sound in the direction (voice of the person A) from surrounding noise, (3) The SpVoiceDetector( ) determines that the extracted sound is voice of a person based on presence of a harmonic structure, (4) The SpVoiceIdentifier( ) including the WildCardCode as the argument identifies whose voice it is, (5) The pSpeechRecognizer( ) interprets the speech "follow me", and (6) When the direction of the voice is determined at the step (1), the robot device 900 turns to the direction of the voice (the right rear) and captures the person A in the viewing field of the camera in the image acquiring unit 112.

The robot device 900 knows that the robot device 900 has to detect the person A from the voice command "follow me". The robot device 900 regards the person A as the detection target, and performs the following procedure. There are two different procedures depending on whether the person A has been registered.

If the person A has been registered as the k-th sound source, the robot device 900 can identify the voice as that of the k-th sound source at the step (4). When the person A is identified as the k-th sound source, the number k is set to the type code 202. To identify the voice of the person A, the auditory feature information 225 includes the dictionary information for identifying the voice of the person A. Furthermore, by calling the SpVoiceTrainer(k) at this time, the robot device 900 adds the sound "follow me" spoken by the person A to the dictionary information so that the voice of the person A can be more accurately identified in the future. The operation is also referred to as an update of existing dictionary.

If the person A has not been registered as the sound source, the robot device 900 cannot identify the voice at the step (4). In such a case, the person A is registered as a new sound source. Specifically, a new type code k=n0+1 is issued, the SpVoiceTrainer(k) is called, and new dictionary information for identifying the voice of the person A is generated. The operation is referred to as generation of a new dictionary. At the same time, the sound source information of the k-th sound source is generated with appropriate initial values, and the number of the sound sources n0 is updated to n0+1.

When the robot device 900 captures the person A in the viewing field of the camera at the step (6), the library function called in the visual feature localizer 114 detects the face area, determines whose face it is, and updates the dictionary information as needed. Specifically, the process is performed in the following manner:

(1) The IpFaceDetector( ) detects and extracts the face area from the image, (2) The IpFaceIdentifier(k) determines whether the extracted area includes the face of the person A. If the IpFaceIdentifier(k) cannot determine, the face of the person A cannot be identified at this time because there is no dictionary information or because the dictionary information is old. The IpFaceTrainer(k) therefore learns the face of the person A, and (3) At the same time, the IpColorTrainer(k) and the IpTextureTrainer(k) learn the colors and textures near the face area (the clothes and the head).

Because the k-th sound source is a person, it is clear that the person can be identified by the color and the texture of the clothes as well as the face. The functions (the image processing procedures) for visually identifying the person A and the priorities thereof are registered as described below.

```
ObjInfo.IpInfo[k].n2=3; // three image processing
procedures
    ObjInfo.IpInfo[k].pImageProcessing[1]=&IpFaceIdentifier(k);
// the face
    ObjInfo.IpInfo[k].pImageProcessing[2]=&IpColorIdentifier(k);
// the color
    ObjInfo.IpInfo[k].pImageProcessing[3]=&IpTextureIdentifier(k)
; // the texture
    ObjInfo.IpInfo[k].Priority[1][j]=1; the priority of the
IpFaceIdentifier( )
    ObjInfo.IpInfo[k].Priority[2][j]=2; the priority of the
IpColorIdentifier( )
    ObjInfo.IpInfo[k].Priority[3][j]=3; the priority of the
IpTextureIdentifier( )
```

Similarly, because the k-th sound source is the person, it is clear that the person can be identified by the voice and footsteps. The functions (the sound processing procedures) for auditorily identifying the person A and the priorities thereof are registered as described below:

```
ObjInfo.IpInfo[k].n2=2; // two image processing procedures
ObjInfo.SpInfo[k].pSoundProcessing[1]=&SpVoiceIdentifier(k);
// the voice
ObjInfo.SpInfo[k].
pSoundProcessing[2]=&SpSoundIdentifier(HumanWalk);
// the sound (footsteps)
    ObjInfo.SpInfo[k].Priority[1][j]=1; the priority of the
SpVoiceIdentifier( )
    ObjInfo.SpInfo[k].Priority[2][j]=2; the priority of the
SpSoundIdentifier( )
```

The priority orders applied to the detection strategies are set as described below indicating the order of "the detection strategies A, C, B".

```
ObjInfo.StInfo[k].PriorityA=1; // the priority of the
detection strategy A
    ObjInfo.StInfo[k].PriorityB=3; // the priority of the
detection strategy B
    ObjInfo.StInfo[k].PriorityC=2; // the priority of the
detection strategy C
```

By setting up as above, the sound source information for the robot device 900 to visually and auditorily detect the person A is prepared.

For example, the person A (the commander) says "follow him" from the right rear of the robot device 900. The sound collecting unit 113 in the robot device 900 receives the sound. The library function called in the auditory feature localizer 115 recognizes the direction of the sound source, the distance from the sound source, the fact that the sound is voice of a person, whose voice it is, and the fact that the spoken words are "follow him". The robot device 900 then turns around.

Specifically, the process is performed in the following manner:

(1) The SpSoundLocalizer( ) computes the direction and the distance of the position in which the person A spoke, (2) The SpSoundSeparator( ) separates and extracts the sound in the direction (voice of the person A) from surrounding noise, (3) The SpVoiceDetector( ) determines that the extracted sound is voice of a person based on presence of the harmonic structure, (4) The SpVoiceIdentifier( ) including the WildCardCode as the argument identifies whose voice it is, (5) The SpSpeechRecognizer( ) interprets the speech "follow him", and (6) When the direction of the voice is determined at the step (1), the robot device 900 turns to the direction of the voice (the right rear) and captures the person A in the viewing field of the camera.

By turning to the person A, the robot device 900 captures a person B beside the person A in the viewing field of the camera. The robot device 900 knows that the robot device 900 has to detect the person B beside the person A from the voice command "follow him". The robot device 900 regards the person B as the detection target, and performs the following procedure.

Because the robot device 900 has not heard voice of the person B, the robot device encourages the person B to speak by greeting him with voice. When the person B speaks, the robot device 900 tries to identify whose voice it is. Specifically, the process is performed in the following manner:

(1) The SpSoundLocalizer( ) computes the direction and the distance of the position in which the person B spoke, (2) The SpSoundSeparator( ) separates and extracts the sound in the direction (voice of the person B) from surrounding noise, (3) The SpVoiceDetector( ) determines that the extracted sound is voice of a person based on presence of the harmonic structure, and (4) The SpVoiceIdentifier( ) including the WildCardCode as the argument identifies whose voice it is.

The following setup procedure is performed. There are two different procedures depending on whether the person B has been registered.

If the person B has been registered as the k-th sound source, the robot device 900 can identify the voice as that of the k-th sound source at the step (4). When the person B is identified as the k-th sound source, the number k is set to the type code 202. To identify the voice of the person B, the auditory feature information 225 includes the dictionary information for identifying the voice of the person B. Furthermore, by calling the SpVoiceTrainer(k) at this time, the robot device 900 adds the sound just spoken by the person B to the dictionary information so that the voice of the person B can be more accurately identified in the future.

When the person B is not registered as the sound source, the robot device 900 cannot identify the voice at the step (4). In such a case, the person B is registered as a new sound source. Specifically, a new type code k=n0+1 is issued, the SpVoiceTrainer(k) is called, and new dictionary information for identifying the voice of the person B is generated. At the same time, the sound source information of the k-th sound source is generated with appropriate initial values, and the number of the sound sources n0 is updated to n0+1.

When the robot device 900 captures the person B in the viewing field of the camera in the image acquiring unit 112, the library function called in the visual feature localizer 114 detects the face area, determines whose face it is, and updates the dictionary information as needed. Specifically, the process is performed in the following manner:

(1) The IpFaceDetector( ) detects and extracts the face area from the image.

(2) The IpFaceIdentifier(k) determines whether the extracted area includes the face of the person B. If the IpFaceIdentifier(k) cannot determine, the face of the person B cannot be identified at this time. The IpFaceTrainer(k) therefore learns the face of the person B.

(3) At the same time, the IpColorTrainer(k) and the IpTextureTrainer(k) learn the colors and textures near the face area (the clothes and the head).

Because the k-th sound source is a person, it is clear that the person can be identified by the color and the texture of the clothes as well as the face. The functions (the image processing procedures) for visually identifying the person B and the priorities thereof are registered as described below:

```
ObjInfo.IpInfo[k].n2=3; // three image processing
procedures
    ObjInfo.IpInfo[k].pImageProcessing[1]=&IpFaceIdentifier(k);
// the face
ObjInfo.IpInfo[k].pImageProcessing[2]=&IpColorIdentifier(k);
// the color
ObjInfo.IpInfo[k].pImageProcessing[3]=&IpTextureIdentifier(k)
; // the texture
    ObjInfo.IpInfo[k].Priority[1][j]=1; the priority of the
IpFaceIdentifier( )
    ObjInfo.IpInfo[k].Priority[2][j]=2; the priority of the
IpColorIdentifier( )
    ObjInfo.IpInfo[k].Priority[3][j]=3; the priority of the
IpTextureIdentifier( )
```

Similarly, because the k-th sound source is the person, it is clear that the person can be identified by the voice and footsteps. The functions (the sound processing procedures) for auditorily identifying the person B and the priorities thereof are registered as described below:

```
ObjInfo.SpInfo[k].n2=2; // two image processing procedures
ObjInfo.SpInfo[k].pSoundProcessing[1]=&SpVoiceIdentifier(k);
// the voice
ObjInfo.SpInfo[k].
pSoundProcessing[2]=&SpSoundIdentifier(HumanWalk);
// the sound (the footsteps)
    ObjInfo.SpInfo[k].Priority[1][j]=1; the priority of the
SpVoiceIdentifier( )
    ObjInfo.SpInfo[k].Priority[2][j]=2; the priority of the
SpSoundIdentifier( )
```

The priority orders applied to the detection strategies are set as described below indicating the order of "the detection strategies A, C, B".

```
ObjInfo.StInfo[k].PriorityA=1; // the priority of the
detection strategy A
    ObjInfo.StInfo[k].PriorityB=3; // the priority of the
detection strategy B
    ObjInfo.StInfo[k].PriorityC=2; // the priority of the
detection strategy C
```

By setting up as above, the sound source information for the robot device 900 to visually and auditorily detect the person B is prepared.

An example of the step S1201 in FIG. 12 is given assuming that the target sound source is not a person.

For example, the person A (a commander) says "follow it" from the right rear of the robot device 900. The sound collecting unit 113 in the robot device 900 receives the sound. The library function called in the auditory feature localizer 115 recognizes the direction of the sound source, the distance from the sound source, the fact that the sound is voice of a person, whose voice it is, and the fact that the spoken words are "follow it". The robot device 900 then turns around. Specifically, the process is performed in the following manner:

(1) The SpSoundLocalizer( ) computes the direction of and the distance from the position in which the person A spoke, (2) The SpSoundSeparator( ) separates and extracts the sound in the direction (voice of the person A) from surrounding noise, (3) The SpVoiceDetector( ) determines that the extracted sound is voice of a person based on presence of the harmonic structure, (4) The SpVoiceIdentifier( ) including the WildCardCode as the argument identifies whose voice it is, (5) The SpSpeechRecognizer( ) interprets the speech "follow it", and (6) When the direction of the voice is determined at the step (1), the robot device 900 turns to the direction of the voice (the right rear) and captures the person A in the viewing field of the camera in the image acquiring unit 112.

By turning to the person A, the robot device 900 captures a dog C beside the person A in the viewing field of the camera. The robot device 900 knows that the robot device 900 has to detect the dog C beside the person A from the voice command "follow it". The robot device 900 regards the dog C as the detection target, and performs the following procedure.

When the robot device 900 captures the dog C in the viewing field of the camera, the library function called in the visual feature localizer 114 detects an outstanding area, and determines which one of the registered sound sources it is. Specifically, the process is performed in the following manner:

(1) The IpColorDetector( ), the IpTextureDetector( ), and the IpDepthDetector( ) divide the image into areas, (2) An area near the person A at the same distance as the person A is extracted as an image area including the dog C, and (3) The IpColorIdentifier(WildCardCode) and the IpTextureIdentifier(WildCardCode) determine what object is included in the area.

The following setup procedure is performed. There are two different procedures depending on whether the dog C has been registered.

If the dog C has been registered as the k-th sound source, the robot device 900 can identify the image area as that of the k-th sound source at the step (3). When the dog C is identified as the k-th sound source, the number k is set to the type code 202. To identify the image of the dog C, the visual feature information 215 includes the dictionary information for identifying the image (the color and the texture) of the dog C. Furthermore, by calling the IpColorTrainer(k) and the IpTextureTrainer(k) at this time, the robot device 900 adds the color and the texture of the dog C seen at present to the dictionary information so that the image of the dog C can be more accurately identified in the future.

If the dog C is not registered as the sound source, the robot device 900 cannot identify the image area at the step (3). In such a case, the dog C is registered as a new sound source. Specifically, a new type code k=n0+1 is issued, the IpColorTrainer(k) and the IpTextureTrainer(k) are called, and new dictionary information for identifying the image of the dog C is generated. At the same time, the sound source information of the k-th sound source is generated with appropriate initial values, and the number of the sound sources n0 is updated to n0+1.

It is known at this time that the k-th sound source can be identified only by the color and the texture because it is not a person. The functions (the image processing procedures) for visually identifying the dog C and the priorities thereof are registered as described below:

```
ObjInfo.IpInfo[k].n2=2; // two image processing procedures
ObjInfo.IpInfo[k].pImageProcessing[1]=&IpColorIdentifier(k);
// the color
ObjInfo.IpInfo[k].pImageProcessing[2]=&IpTextureIdentifier(k)
; // the texture
    ObjInfo.IpInfo[k].Priority[1][j]=1; the priority of the
IpColorIdentifier( )
    ObjInfo.IpInfo[k].Priority[2][j]=2; the priority of the
IpTextureIdentifier( )
```

Similarly, because the k-th sound source is not a person, it is clear that the k-th sound source can be identified by the bark and the footsteps, both of which are kinds of the sound. The functions (the sound processing procedures) for auditorily identifying the dog C and the priorities thereof are registered as described below.

```
ObjInfo.SpInfo[k].n2=1; // one image processing procedure
ObjInfo.SpInfo[k].
pSoundProcessing[1]=&SpSoundIdentifier(DogWalk|Bowwow);
// the sound (the footsteps and the bark)
    ObjInfo.SpInfo[k].Priority[1][j]=1; the priority of the
SpSoundIdentifier( )
```

The priority orders applied to the detection strategies are set as described below indicating the order of "the detection strategies A, C, B".

```
ObjInfo.StInfo[k].PriorityA=1; // the priority of the
detection strategy A
    ObjInfo.StInfo[k].PriorityB=3; // the priority of the
detection strategy B
    ObjInfo.StInfo[k].PriorityC=2; // the priority of the
detection strategy C
```

By setting up as above, the sound source information for the robot device 900 to visually and auditorily detect the dog C is prepared.

Variation of the setting of the functions and priorities depending on whether the detection target is a person is stored in the robot device as the prior knowledge. The difference can be determined by the robot device based on the voice command input according to the setting procedure and other input operations not shown herein.

When the detection target is a new sound source that is not registered to the sound source information at the time of the setting, the same settings are made in all the areas in the map information 1030 so that no area remains unset.

The image processing functions and the sound processing functions described above are realized by combining the technologies described in the following documents with expertise in the field.

(Subroutine Function)

```
void IpFaceDetector( ); // document 1
void IpColorDetector( ); // documents 2 and 8
void IpTextureDetector( ); // document 8
void IpDepthDetector( ); // document 7
```

(Learning Function)

```
void IpFaceTrainer(k); // document 1
void IpColorTrainer (k); // documents 2 and 8
void IpTextureTrainer (k); // document 8
```

(Identifying Function)

```
void IpFaceIdentifier(k); // document 1
void IpColorIdentifier (k); // documents 2 and 8
void IpTextureIdentifier (k); // document 8
```

(Subroutine Function)

```
void SpVoiceDetector( ); // document 6
void SpSoundDetector( ); // document 6
void SpSoundLocalizer( ); // document 5
void SpSoundSeparator( ); // document 5
void SpSpeechRecognizer( ); // document 5
```

(Learning Function)

```
void SpVoiceTrainer(k); // document 3
void SpSoundTrainer(flg); // document 4
```

(Identifying Function)

```
void SpVoiceIdentifier(k); // document 3
void SpSoundIdentifier (flg); // document 4
```

Document 1 JP-A 2000-30065 (KOKAI)
Document 2 "Acquisition Of Color Patterns For Person Identification By Mobile Camera" ROBOMEC 2005, 1P2-NN-046, June 2005
Document 3 JP-A H10-97274 (KOKAI)
Document 4 JP-A 2000-268265 (KOKAI)
Document 5 "Clustering Sound From Sound Source By Hough Conversion And Application To Auditory Function Of Robot" 22nd SIG AI Challenge, JSAI, pp. 53-58, October 2005
Document 6 "Fundamental Frequency Estimation Based on Dominance Spectrum" Technical Report of IEICE SP2001-138, pp. 21-28, March 2002
Document 7 "Three-Dimensional Vision" Kyoritsu Shuppan Co., Ltd., April 1998
Document 8 "Visual Following on Rear Side for Robot That Follows Human" ROBOMEC 2004, 2P1-H-37, June 2004

An example of identifying the initial position of the sound source at the step S1202 is explained below. Because the face or the image of the k-th sound source is detectable at the step S1201, the sound-source detector 116 computes an absolute position (x, y) of the k-th sound source in the map information 1030 from the direction of the k-th sound source and the distance from the k-th sound source (relative values to the robot device 900) at the step S1202. The MapInfo is searched for a rectangular area that includes the (x, y), and an area number j is identified. The position (x, y) and the area number j of the k-th sound source are stored in the storage unit 911. The position and the orientation of the robot device 900 in the map information 1030 are known at this time.

An example of selecting the strategy and the detection procedures at the steps S1203 and S1204 is explained below. The sound-source detector 116 selects the detection strategy with the highest priority corresponding to the area j that includes the k-th sound source. Based on the setting described above, the strategy A is selected.

The sound-source detector 116 sends an instruction to the visual feature localizer 114 to compare the priority of each image processing procedure corresponding to the area j and select, for example, two image processing procedures with the highest priority. Based on the setting for the persons A and B, the IpFaceIdentifier(k) and the IpColorIdentifier(k) are selected. Based on the setting for the dog C, the IpColorIdentifier(k) an d the IpTextureIdentifier(k) are selected.

Furthermore, the sound-source detector 116 sends an instruction to the auditory feature localizer 115 to compare the priority of each sound processing procedure corresponding to the area j and select, for example, two sound processing procedures with the highest priority. Based on the setting for the persons A and B, the SpVoiceIdentifier(k) and the SpSoundIdentifier(HumanWalk) are selected. Based on the setting for the dog C, the SpSoundIdentifier (DogWalk|Bowwow) is selected.

By selecting as above, the robot device 900 is ready to control the positional relation with the k-th sound source.

An example of detecting and controlling the positional relation at the steps S1205, S1206, and S1207 is explained below. The sound-source detector 116 runs the visual feature localizer 114 and the auditory feature localizer 115 according to the detection strategy, the image processing procedure, and the sound processing procedure selected at the steps S1203 and S1204 and detects the k-th sound source. At the same time, the sound-source detector 116 refers to the visually localizing information and the auditorily localizing information output from the visual feature localizer 114 and the auditory feature localizer 115, and outputs the sound-source detecting information that describes the direction of the k-th sound source and the distance from the k-th sound source. Upon receiving the sound-source detecting information, the positional-relation controlling unit 119 controls the positional relation between the robot device 900 and the k-th sound source.

An example of identifying the position of the sound source at the step S1208 is explained below. The self-position identifying unit 920 identifies the current position and the current direction of the robot device 900 in the map information 1030, and the sound-source detector 116 computes coordinate values of the k-th sound source in the map information 1030 so that the area j of the k-th sound source is identified.

An example of updating the success probability at the steps S1209, S1210, and S1211 is explained below. The sound-source detector 116 updates the success probability information that includes the trial time period, the success time period, and the success probability and the priority associated with the area j of the k-th sound source based on the result of detection by the visually localizing information. The sound-source detector 116 updates the success probability information that includes the trial time period, the success time period, and the success probability and the priority associated with the area j of the k-th sound source based on the result of detection by the auditorily localizing information. The sound-source detector 116 updates the visual success probability and the auditory success probability associated with the area j based on the updated success probabilities. Furthermore, the sound-source detector 116 updates the priority of each detection strategy associated with the area j based on the updated visual success probability and the auditory success probability.

An example of determining the success of the detection at the step S1212 is explained below. If the detection of the k-th sound source was successful, the sound-source detector 116 initializes the value of the time-out counter to zero, and the process returns to the step S1205. If the detection of the k-th sound source failed, the process advances to the step S1213.

An example of determining whether the sound source has moved at the step S1213 is explained below. The sound-source detector 116 determines whether the k-th sound source has moved to another area in the map information 1030. If the k-th sound source has moved to another area, the process moves to the step S1214. If the k-th sound source has not moved to another area, the process moves to the step S1216.

An example of the adaptation to the new area at the steps S1214 and S1215 is explained below. If the k-th sound source has moved to another area, the sound-source detector 116 again selects a detection strategy and, for example, at most two image processing procedures and two sound processing procedures with the highest priority associated with the new area.

An example of determining the timeout at the step S1216 is explained below. If the sound source has not moved beyond the area j, the sound-source detector 116 increments the value of the time-out counter by one. The time-out counter thereby counts the number of continuous failures of the detection. The sound-source detector 116 repeats the steps S1205 to S1213 until the value of the time-out counter reaches the time-out threshold. When it reaches the time-out threshold, the process moves to the step S1217.

An example of changing the strategy and the detection procedures at the steps S1217 and S1218 is explained below. When the value of the time-out counter reaches the time-out threshold, the sound-source detector 116 reviews the detection strategy, the image processing procedure, and the sound processing procedure because the detection failed too many times. Specifically, because the probabilities and the priorities were updated at the steps S1209, S1210, and S1211, the sound-source detector 116 again selects, for example, a detection strategy, at most two image processing procedures, and at most two sound processing procedures with the highest priority associated with the area j by generally performing the same processes as the steps S1203 and S1204.

When the detection strategy, the image processing procedure, and the sound processing procedure selected at the steps S1217 and S1218 are same as those just used, a different combination of the detection strategy, the image processing procedure, and the sound processing procedure are selected using random numbers to perform the trial-and-error process. However, when few functions are registered and different combination cannot be selected, the sound-source detector 116 continues to use the same combination.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A position detecting device comprising:
   a storage unit that stores therein sound source information including:
      identification information assigned to each sound source that can be visually and auditorily identified,
      image processing information including an image processing procedure for visually identifying sound sources and visual feature information indicative of visual features of the sound sources,
      sound processing information including a sound processing procedure for auditorily identifying the sound sources and auditory feature information indicative of auditory features of the sound sources, and
      a plurality of pieces of detection strategy information indicative of which one or both of the image processing information and the sound processing information is to be used to detect the sound sources;
   an image acquiring unit that acquires an image of the sound sources;
   a sound collecting unit that collects sound produced by the sound sources;
   a visual-feature detecting unit that detects a visual feature of a sound source by performing the image processing procedure based on the image acquired by the image acquiring unit and the image processing information, detects a first position of the sound source from the visual feature, and outputs visually localizing information indicative of the first position of the sound source;
   an auditory-feature detecting unit that detects an auditory feature of the sound source by performing the sound processing procedure based on the sound collected by the sound collecting unit and the sound processing information, detects a second position of the sound source based on the auditory feature, and outputs auditorily localizing information indicative of the second position of the sound source; and
   a sound-source detecting unit that controls the visual-feature detecting unit and the auditory-feature detecting unit based on the detection strategy information, and detects a third position of the sound source based on the visually localizing information output from the visual-feature detecting unit and the auditorily localizing information output from the auditory-feature detecting unit.

2. The device according to claim 1, wherein
   the storage unit stores therein a plurality of pieces of the detection strategy information,
   the sound source information associates applied detection-strategy information that defines priority order of the pieces of the detection strategy information with identifying information of the sound source, and
   the sound-source detecting unit selects a piece of the detection strategy information based on the priority order, and controls the visual-feature detecting unit and the auditory-feature detecting unit based on the selected detection strategy information.

3. The device according to claim 2, wherein, when the sound-source detecting unit cannot detect the sound source, the sound-source detecting unit selects another piece of the detection strategy information based on the priority order, and controls the visual-feature detecting unit and the auditory-feature detecting unit based on the other selected detection strategy information.

4. The device according to claim 3, wherein the plurality of pieces of the detection strategy information includes a first detection strategy for performing detection by the visual-feature detecting unit alone and for performing the detection by the auditory-feature detecting unit only when the visual-feature detecting unit fails the detection, a second detection strategy for performing the detection by the auditory-feature detecting unit alone and for performing the detection by the visual-feature detecting unit only when the auditory-feature detecting unit fails the detection, and a third detection strategy for performing the detection by both of the visual-feature detecting unit and the auditory-feature detecting unit.

5. The device according to claim 1, wherein
the sound source information associates a plurality of the image processing procedures with a priority order with respect to each piece of the identification information, and
the visual-feature detecting unit selects the image processing procedure based on the priority order, performs the image processing procedure, detects the visual feature of the sound source, and outputs the visually localizing information.

6. The device according to claim 5, wherein, when the sound-source detecting unit cannot detect the sound source, the sound-source detecting unit selects another image processing procedure, and controls the visual-feature detecting unit to perform the image processing procedure.

7. The device according to claim 1, wherein
the sound source information associates a plurality of the sound processing procedures with a priority order with respect to each piece of the identification information, and
the auditory-feature detecting unit selects the sound processing procedure based on the priority order, performs the sound processing procedure, detects the auditory feature of the sound source, and outputs the auditorily localizing information.

8. The device according to claim 7, wherein, when the sound-source detecting unit cannot detect the sound source, the sound-source detecting unit selects another sound processing procedure, and controls the auditory-feature detecting unit to perform the sound processing procedure.

9. The device according to claim 1, further comprising a learning unit that selects a sound input from a direction while the visual-feature detecting unit is detecting the sound source in the direction, generates the auditory feature information from the sound, registers the auditory feature information to the sound processing information associated with the identifying information of the sound source, selects an image input from the direction while the auditory-feature detecting unit is detecting the sound source in the direction, generates the visual feature information from the image, and registers the visual feature information to the image processing information associated with the identifying information of the sound source.

10. The device according to claim 1, further comprising a self-position identifying unit that identifies a position of the device, wherein
the storage unit further stores therein map information indicative of positional information of areas that can include the sound source,
the sound source information includes the image processing information and the sound processing information with respect to each area,
the sound-source detecting unit identifies an area that includes the sound source based on the position identified by the self-position identifying unit,
the visual-feature detecting unit detects the visual feature of the sound source by performing the image processing procedure based on the image and the image processing information associated with the area, and outputs the visually localizing information, and
the auditory-feature detecting unit detects the auditory feature by performing the sound processing procedure based on the sound and the sound processing information associated with the area, and outputs the auditorily localizing information.

11. The device according to claim 10, wherein
the storage unit stores therein a plurality of pieces of the detection strategy information,
the sound source information associates applied detection-strategy information that defines priority order of the pieces of detection strategy information with identifying information of the sound source, and
the sound-source detecting unit selects the detection strategy information based on the priority order defined for the area, and controls the visual-feature detecting unit and the auditory-feature detecting unit based on the selected detection strategy information.

12. The device according to claim 10, further comprising a learning unit that selects a sound input from a direction while the visual-feature detecting unit is detecting the sound source in the direction, generates the auditory feature information from the sound, registers the auditory feature information to the sound processing information associated with the identifying information and the area of the sound source, selects an image input from the direction while the auditory-feature detecting unit is detecting the sound source in the direction, generates the visual feature information from the image, and registers the visual feature information to the image processing information associated with the identifying information and the area of the sound source.

13. An autonomous mobile device comprising:
a storage unit that stores therein:
identification information assigned to each sound source that can be visually and auditorily identified,
image processing information including an image processing procedure for visually identifying sound sources and visual feature information indicative of visual features of the sound sources,
sound processing information including a sound processing procedure for auditorily identifying the sound sources and auditory feature information indicative of auditory features of the sound sources, and
a plurality of pieces of detection strategy information indicative of which one or both of the image processing information and the sound processing information is to be used to detect the sound sources;
an image acquiring unit that acquires an image of the sound sources;
a sound collecting unit that collects sound produced by the sound sources;
a visual-feature detecting unit that detects a visual feature of a sound source by performing the image processing procedure based on the image acquired by the image acquiring unit and the image processing information, detects a first position of the sound source from the visual feature, and outputs visually localizing information indicative of the first position of the sound source;
an auditory-feature detecting unit that detects an auditory feature of the sound source by performing the sound processing procedure based on the sound collected by the sound collecting unit and the sound processing information, detects a second position of the sound source based on the auditory feature, and outputs auditorily localizing information indicative of the second position of the sound source;

a sound-source detecting unit that controls the visual-feature detecting unit and the auditory-feature detecting unit based on the detection strategy information, and detects a third position of the sound source based on the visually localizing information output from the visual-feature detecting unit and the auditorily localizing information output from the auditory-feature detecting unit; and a positional-relation controlling unit that controls positional relation of the device with the sound source based on the position of the sound source detected by the sound-source detecting unit.

14. The device according to claim 13, further comprising a self-position identifying unit that identifies a position of the device, wherein the storage unit further stores therein map information indicative of positional information of areas that can include the sound source, the sound source information includes the image processing information and the sound processing information with respect to each area, the sound-source detecting unit identifies an area that includes the sound source based on the position identified by the self-position identifying unit, the visual-feature detecting unit detects the visual feature of the sound source by performing the image processing procedure based on the image and the image processing information associated with the area, and outputs the visually localizing information, and the auditory-feature detecting unit detects the auditory feature by performing the sound processing procedure based on the sound and the sound processing information associated with the area, and outputs the auditorily localizing information.

15. A method of detecting a position of a sound source that can be visually and auditorily identified, comprising:

acquiring an image of sound sources;

collecting sound produced by the sound sources;

first detecting including detecting a visual feature of a sound source based on:

identification information assigned to each sound source that can be visually and auditorily identified, image processing information including an image processing procedure for visually identifying the sound sources and visual feature information indicative of visual features of the sound source, sound processing information including a sound processing procedure for auditorily identifying the sound sources and auditory feature information indicative of auditory features of the sound source, a plurality of pieces of detection strategy information indicative of which one or both of the image processing information and the sound processing information is to be used to detect the sound source, and the acquired image;

second detecting including detecting a first position of the sound source from the visual feature detected at the first detecting;

first outputting including outputting visually localizing information indicative of the first position of the sound source detected at the second detecting;

third detecting including detecting an auditory feature of the sound source based on the sound processing information and the collected sound;

fourth detecting including detecting a second position of the sound source based on the auditory feature detected at the third detecting;

second outputting including outputting auditorily localizing information indicative of the second position of the sound source detected at the fourth detecting; and fifth detecting including detecting a third position of the sound source based on the visually localizing information output at the first outputting and the auditorily localizing information output at the second outputting.

16. A computer program product having a computer readable medium including program instructions for detecting a position of a sound source that can be visually and auditorily identified, wherein the instructions, when executed by a computer, cause the computer to perform:

acquiring an image of sound sources;

collecting sound produced by the sound sources;

first detecting including detecting a visual feature of a sound source based on:

identification information assigned to each sound source that can be visually and auditorily identified, image processing information including an image processing procedure for visually identifying the sound sources and visual feature information indicative of visual features of the sound source, sound processing information including a sound processing procedure for auditorily identifying the sound sources and auditory feature information indicative of auditory features of the sound source, a plurality of pieces of detection strategy information indicative of which one or both of the image processing information and the sound processing information is to be used to detect the sound source, and the acquired image;

second detecting including detecting a first position of the sound source from the visual feature detected at the first detecting;

first outputting including outputting visually localizing information indicative of the first position of the sound source detected at the second detecting;

third detecting including detecting an auditory feature of the sound source based on the sound processing information and the collected sound;

fourth detecting including detecting a second position of the sound source based on the auditory feature detected at the third detecting;

second outputting including outputting auditorily localizing information indicative of the second position of the sound source detected at the fourth detecting; and fifth detecting including detecting a third position of the sound source based on the visually localizing information output at the first outputting and the auditorily localizing information output at the second outputting.

* * * * *